US008243981B2

(12) United States Patent
Zandifar et al.

(10) Patent No.: US 8,243,981 B2
(45) Date of Patent: Aug. 14, 2012

(54) IDENTIFYING EMBEDDED DATA IN AN IMAGE

(75) Inventors: Ali Zandifar, Cupertino, CA (US); Che-Bin Liu, Milpitas, CA (US)

(73) Assignee: Seiko Epson Corporation, Tokyo (JP)

( * ) Notice: Subject to any disclaimer, the term of this patent is extended or adjusted under 35 U.S.C. 154(b) by 1296 days.

(21) Appl. No.: 11/945,139

(22) Filed: Nov. 26, 2007

(65) Prior Publication Data

US 2009/0136080 A1 May 28, 2009

(51) Int. Cl.
*G06K 9/00* (2006.01)
*H04L 9/32* (2006.01)

(52) U.S. Cl. ......................... 382/100; 713/176
(58) Field of Classification Search .................. 382/100, 382/164, 173, 190; 380/51, 54, 252, 287; 370/522–529; 283/72, 74–85; 358/3.28
See application file for complete search history.

(56) References Cited

U.S. PATENT DOCUMENTS

| | | | |
|---|---|---|---|
| 6,148,102 A | 11/2000 | Stolin | |
| 6,354,630 B1 | 3/2002 | Zhang et al. | |
| 6,574,348 B1 | 6/2003 | Venkatesan et al. | |
| 6,580,804 B1 | 6/2003 | Abe | |
| 6,721,439 B1 * | 4/2004 | Levy et al. | 382/100 |
| 6,738,495 B2 * | 5/2004 | Rhoads et al. | 382/100 |
| 6,763,122 B1 | 7/2004 | Rodriguez et al. | |
| 6,769,061 B1 | 7/2004 | Ahern | |
| 6,771,820 B1 | 8/2004 | Oakeson | |
| 6,775,393 B2 | 8/2004 | Levy et al. | |
| 6,909,803 B2 | 6/2005 | Uchida | |
| 6,973,195 B1 | 12/2005 | Matsui | |
| 6,983,056 B1 | 1/2006 | Amano | |
| 6,993,154 B2 | 1/2006 | Brunk | |
| 7,031,493 B2 | 4/2006 | Fletcher et al. | |
| 7,039,214 B2 | 5/2006 | Miller et al. | |
| 7,039,215 B2 | 5/2006 | Suzaki | |
| 7,043,080 B1 | 5/2006 | Dolan | |
| 7,058,200 B2 | 6/2006 | Donescu et al. | |
| 7,061,492 B2 | 6/2006 | Carrai et al. | |
| 7,062,069 B2 | 6/2006 | Rhoads | |
| 7,072,487 B2 | 7/2006 | Reed et al. | |
| 7,076,081 B2 | 7/2006 | Hwang et al. | |
| 7,085,399 B2 * | 8/2006 | Suzaki | 382/100 |
| 7,106,884 B2 | 9/2006 | Tamaru | |
| 7,107,451 B2 * | 9/2006 | Moskowitz | 713/176 |
| 7,130,444 B2 | 10/2006 | Honsinger et al. | |
| 7,130,461 B2 | 10/2006 | Rosenholtz | |
| 7,133,565 B2 | 11/2006 | Toda et al. | |
| 7,159,118 B2 | 1/2007 | Petrovic | |
| 7,197,161 B2 * | 3/2007 | Fan | 382/100 |
| 7,203,335 B2 | 4/2007 | Fielding et al. | |
| 7,203,565 B2 | 4/2007 | Sato | |
| 2002/0029338 A1 | 3/2002 | Bloom et al. | |
| 2003/0068097 A1 | 4/2003 | Wilson et al. | |

(Continued)

*Primary Examiner* — Abolfazl Tabatabai

(57) ABSTRACT

Disclosed are embodiments of systems and methods for embedding and/or extracting data from images. In embodiments, an image may be segmented into regions, and characters or other image groups within a segmented region may be determined to be embedding sites. A data vector may be embedded into a set of corresponding ordered embedding sites by representing each data element as different intensity values assigned to the pixels within one portion of an embedding site relative to the pixels in another portion of the embedding site. In embodiments, embedded data may be extracted from an image by extracting and decoding a set of bit values from a set of identified and ordered embedding sites.

20 Claims, 33 Drawing Sheets

U.S. PATENT DOCUMENTS

| | | |
|---|---|---|
| 2004/0101160 A1 | 5/2004 | Kunisa |
| 2004/0263911 A1 | 12/2004 | Rodriguez et al. |
| 2005/0002566 A1 | 1/2005 | Di Federico et al. |
| 2006/0203255 A1 | 9/2006 | Takaragi et al. |
| 2006/0210108 A1 | 9/2006 | Brunk et al. |
| 2007/0005977 A1 | 1/2007 | Tohne et al. |
| 2007/0147653 A1 | 6/2007 | Reed et al. |
| 2007/0201099 A1 | 8/2007 | Eguchi et al. |

* cited by examiner

600

---

Size
Retain embedding site if its bounding box width and height exceed a threshold — 605

---

Shape
Reject embedding site if:
Embedding site bounding box width < (height * c)
OR
Embedding site bounding box height < (width * c)
where 0<c<1 — 610

---

Complexity
Reject embedding site if any corner of its bounding box is inside another embedding site's bounding box — 615

| Order text lines in image by performing a vertical sweep down horizontal lines on the image | ⌒ 705 |

↓

| Order embedding sites in each text line by performing a horizontal sweep across bounding boxes on the line | ⌒ 710 |

| Size
Retain embedding site if its bounding box width and height exceed a threshold | ╱─1805 |

```
┌─────────────────────────────────────┐
│  Divide a candidate embedding site  │
│  into a first section and a second  │─── 2005
│  section                            │
└─────────────────────────────────────┘
                 │
                 ▼
┌─────────────────────────────────────┐
│  Compute the mean intensity value   │
│  of the pixels in each section      │─── 2010
│  using cumulative density function  │
└─────────────────────────────────────┘
                 │
                 ▼
┌─────────────────────────────────────┐
│  Use the difference between the     │
│  mean intensity values to determine │─── 2015
│  the embed pattern, if any          │
└─────────────────────────────────────┘
```

FIGURE 20

IDENTIFYING EMBEDDED DATA IN AN IMAGE

BACKGROUND

A. Technical Field

The present invention pertains generally to image processing, and relates more particularly to embedding and/or extracting data in images.

B. Background of the Invention

The proliferation of computers with increasing computational power has contributed to the growth of digital image processing. Digital images can typically be copied without concern for image degradation. Digital images can also be easily modified, enhanced, and adapted to provide high-quality images that meet a wide range of application requirements. These characteristics of digital images are also sources of concern for owners of images that wish to protect copyrights in the images or that wish to detect and identify sources of unauthorized copying.

In response to these concerns, there have been attempts to develop ways to embed information into digital signals, such as images, that can identify the owner of the digital signal or that can identify the device that was used to produce the digital signal or a copy thereof. In particular, there has been considerable effort to develop ways to embed authenticating information into images to enable subsequent proof of ownership or to enable source tracking for images produced on permanent media such as paper.

Some implementations embedded information that is clearly visible in the images. Although such methods make detection easy, it distorts the original image. Other attempts to make the embedded data more inconspicuous require extraction methods that are time consuming or require extensive computational effort to detect the embedded information. Furthermore, such methods may not reliably extract the embedded information.

What are needed are information embedding techniques that can embed data into a digital signal, such as an image, and can easily and robustly recover the embedded data.

SUMMARY OF THE INVENTION

Systems and methods are described for embedding and/or extracting data in images. In embodiments, an image may be segmented, and characters or other image groups may be identified. In embodiments, characters or other image groups may be determined to be embedding sites, which are ordered. In embodiments, the characters or other image groups may need to satisfy one or more constraint to qualify as an embedding site. Data may be bit encoded into a bit vector, which may be further encoded using an error-correcting code. Multiple instances of the bit vector may be written to a bitstream. Each bit of the bitstream may be embedded into a corresponding ordered embedding site by encoding the bit value as different intensity values assigned to the pixels within one portion of the embedding site relative to the pixels in another portion of the embedding site. In embodiments, data may be extracted from an image by identifying and ordering candidate embedding sites, extracting a bitstream by determining the bit values of the bits embedded into the embedding sites, segmenting the bitstream by parsing it into instances of a data vector, and decoding the data vector.

In embodiments, a method for embedding data into an image may comprise identifying a set of ordered embedding sites in the image, encoding the data into a vector comprising a set of ordered values, associating the set of ordered values with at least some of the ordered embedding sites, and embedding the data into the image by applying a unique embed pattern associated with a data value to the embedding site associated with the data value. An embed pattern comprises a unique intensity difference between a first region of pixels and a second region of pixels within a single embedding site. In embodiments, embedding data into an image may further comprise dilating pixels in the region of an embedding site that corresponds to a region of a unique embed pattern that has a greater intensity value.

In embodiments, the step of identifying a set of ordered embedding sites in an image may comprise segmenting the image into regions, identifying a plurality of connected components comprising pixels from one of the regions, identifying a plurality of embedding sites within the plurality of connected components, and assigning an order to the plurality of embedding sites. In embodiments, identifying a plurality of embedding sites within the plurality of connected components may comprise selecting a plurality of candidate embedding sites from the plurality of connected components, and selecting an embedding site based upon at least one characteristic of a candidate embedding site. In embodiments, a characteristic may apply to the size, shape, or position of a bounding box of a candidate embedding site.

In embodiments, assigning an order to a plurality of embedding sites may comprise using the positions of embedding sites within the plurality of embedding sites. In embodiments, using the positions may comprise performing a first direction sweep on the image to order a plurality of groups of embedding sites, and performing a second direction sweep on at least one group of embedding sites to order a set of embedding sites within the group.

In other embodiments, assigning an order to a plurality of embedding sites may comprise ordering a first plurality of groups of embedding sites by performing a first direction sweep on the image; rotating the image by a first angle of rotation; ordering a second plurality of groups of embedding sites by performing the first direction sweep on the rotated image; and determining which of the first and the second plurality of groups has a greater number of groups of embedding sites and selecting that plurality of groups of embedding sites as the plurality of groups of embedding sites.

In embodiments, encoding data into a vector may comprise including an indicator prefix with the data, and bit-encoding the indicator prefix and the data into the vector. In embodiments, encoding data may further comprise the step of encoding the vector using an error-correcting code.

In embodiments, a method for embedding a data value into an embedding site comprising pixels from an image may comprise segmenting the image into regions; identifying a plurality of connected components comprising pixels from one of the regions; identifying a plurality of candidate embedding sites within the plurality of connected components; selecting the embedding site from the plurality of candidate embedding sites based upon at least one characteristic of a candidate embedding site; and associating the data value with the embedding site. In embodiments, the characteristic may apply to a bounding box of a candidate embedding site.

In embodiments, selecting an embedding site from a plurality of candidate embedding sites may comprise selecting the embedding site if its bounding box has a width that exceeds a first threshold and a height that exceeds a second threshold. In embodiments, the first and second threshold values may be the same or different values. In embodiments, an embedding site may not be selected if its bounding box has a width less than its height multiplied by a first value. In embodiments, an embedding site may not be selected if its bounding box has a height less than its width multiplied by a second value. In embodiments, an embedding site may not be selected if its bounding box intersects a different bounding box of a different embedding site.

In embodiments, a system for embedding a data vector into an image may comprise an encoder and a message embedder. The message embedder may comprise an embed pattern embedder. In embodiments, the message embedder may further comprise an embedding site selector and an embedding site ordering processor.

In embodiments, a method for extracting data from an image comprising pixels may comprise identifying a set of ordered candidate embedding sites in the image; extracting a set of data values from the set of ordered candidate embedding sites; extracting at least one data vector from the set of data values by segmenting the set of data values; and decoding the data vector. A data value may be extracted from an ordered candidate embedding site by examining a difference between a first average intensity value of the pixels in a first portion of the ordered candidate embedding site and a second average intensity value of the pixels in a second portion of the ordered candidate embedding site.

In embodiments, identifying a set of ordered candidate embedding sites in the image comprises segmenting the image into regions; dilating pixels from one of the regions; identifying a plurality of connected components from a set of pixels selected from the region with dilated pixels; selecting a set of candidate embedding sites; and assigning an order to the candidate embedding sites within the set of candidate embedding sites. In embodiments, a candidate embedding site may comprise at least one connected component selected from the plurality of connected components.

In embodiments, selecting a set of candidate embedding sites may further comprise selecting a candidate embedding site based upon at least one characteristic of the candidate embedding site. A candidate embedding site may be selected responsive to a bounding box that bounds the candidate embedding site having a width that exceeds a first size threshold. A candidate embedding site may be selected responsive to a bounding box that bounds the candidate embedding site having a height that exceeds a second size threshold. In embodiments, the first and second size thresholds may be the same or different values.

In embodiments, assigning an order to a set of candidate embedding sites may comprise ordering the candidate embedding sites using the positions of the candidate embedding sites within the image. In embodiments, using a position of a candidate embedding site may comprise performing a first direction sweep on the image to order a plurality of groups of candidate embedding sites; and performing a second direction sweep on at least one group of candidate embedding sites within the plurality of groups to order a set of candidate embedding sites within the group.

In embodiments, extracting a set of data values from at least some of a set of ordered candidate embedding sites may comprise examining a difference between a first average intensity value of the pixels in a first portion of the ordered candidate embedding site and a second intensity value of the pixels in a second portion of the ordered candidate embedding site, extracting an embed pattern responsive to a difference between the first average value and the second intensity value being greater than a threshold, and correlating the embed pattern with a data value.

In other embodiments, extracting a set of data values from at least some of a set of ordered candidate embedding sites may comprise identifying a first set of ordered candidate embedding sites in the image; extracting a first set of data values from at least some of the first set of ordered candidate embedding sites; rotating the image by a first angle of rotation; identifying a second set of ordered candidate embedding sites in the rotated image; extracting a second set of data values from at least some of the second set of ordered candidate embedding sites; and determining which of the first and the second set of data values has a greater number of data values and selecting that set of data values as the set of data values.

In embodiments, the data vector may be a bit vector and decoding the data vector may comprise removing an indicator prefix from the bit vector and extracting the data by decoding the bit vector. In embodiments, decoding the data vector may further comprise applying an error-correcting code decoder to the bit vector.

In embodiments, a system for extracting data from an image comprising pixels may comprise a message extractor that extracts at least one data vector from the image; and a decoder that decodes the data vector to extract the data.

In embodiments, a system for extracting a data vector from a set of embedded data values within an image comprising pixels may comprise an embedding site selector that identifies a set of candidate embedding sites in the image; an embedding site ordering processor that orders the candidate embedding sites to form a set of ordered candidate embedding sites; a bitstream extractor that extract a set of data values from at least some of the set of ordered candidate embedding sites; and a bitstream segmenter that segments the set of data values to obtain at least one data vector. In embodiments, a data value may be extracted from an ordered candidate embedding site by examining a difference between a first average intensity value of the pixels in a first portion of the ordered candidate embedding site and a second average intensity value of the pixels in a second portion of the ordered candidate embedding site.

In embodiments, a method for determining a robust average intensity of pixels from a portion of an image may comprise computing a cumulative density function based upon an intensity histogram of the pixels from at least a portion of the image; using the cumulative density function to identify pixels to exclude; calculating a robust average intensity using at least some of the pixels that were not excluded; using the robust average intensity to determine an embed pattern in a candidate embedding site; and using the embed pattern to extract a data value from the candidate embedding site. In embodiments, using the cumulative density function to identify pixels to exclude may comprise excluding the pixels having an intensity corresponding to a cumulative density function that is below a first cumulative density function threshold value; and excluding the pixels having an intensity corresponding to a cumulative density function that is above a second cumulative density function threshold value.

In embodiments, the robust average intensity may be a first mean intensity of at least some of the pixels that were not excluded. In embodiments, the robust average intensity may be a second mean intensity calculated by excluding the pixels having an intensity value greater than the first mean intensity value and calculating the second mean intensity using at least some of the pixels that were not excluded.

In embodiments, using the robust average intensity to determine an embed pattern in a candidate embedding site may comprise calculating a difference between a first robust average intensity value of pixels in a first portion of a candidate embedding site and a second robust average intensity value of pixels in a second portion of the candidate embedding site; and determining which robust average intensity is greater than the other robust average intensity value if the difference is greater than a threshold.

In embodiments, using the embed pattern to extract a data value from a candidate embedding site may comprise correlating the embed pattern with a data value.

In embodiments, a method for extracting a data vector from an image comprising pixels may comprise identifying an embed pattern in a candidate embedding site in the image; correlating the embed pattern with a data value; extracting a set of data values from a set of ordered candidate embedding sites in the image; and extracting at least one data vector by segmenting the set of data values.

In embodiments, a system for extracting a data vector from an image comprising pixels may comprise an embedding site ordering processor that orders at least some candidate embedding sites from a set of candidate embedding sites from the image to form a set of ordered candidate embedding sites; a bitstream extractor that extracts a set of data values from at least some of the set of ordered candidate embedding sites; and a bitstream segmenter that segments the set of data values to obtain at least one data vector. In embodiments, a data value may be extracted from an ordered candidate embedding site by examining a difference between a first robust average intensity value of the pixels in a first portion of the ordered candidate embedding site and a second robust average intensity value of the pixels in a second portion of the ordered candidate embedding site.

In embodiments, a method for identifying a robust average intensity of a portion of an embedding site comprising a plurality of pixels may comprise selecting reliable intensity value pixels from a first portion of the plurality of pixels to form a first set of reliable pixels; iteratively pruning, from the first set of reliable pixels, reliable intensity value pixels that reside in an outer region of a histogram of the first set of reliable pixels until a difference between successive average intensity values of the first set of reliable pixels is less than a difference threshold; and setting a first robust average intensity value of the first set of reliable pixels based upon at least one of the successive average intensity values that had less than a difference threshold. In embodiments, a data value may be represented as a difference between a first robust average intensity value of a first portion of the plurality of pixels in an embedding site and a second robust average intensity value of a second portion of the plurality of pixels in the embedding site. In embodiments, the method may further comprise extracting a data value from the embedding site by calculating a second robust average intensity value of a second set of reliable pixels from the embedding site; extracting an embed pattern from the embedding site by determining which of the first and second robust average intensity values is greater than the other robust average intensity value if the difference between the first and second robust average intensity values is greater than a threshold; and correlating the embed pattern with a data value. In embodiments, the method may further comprise extracting data vector from the image by extracting a set of data values from a set of ordered embedding sites in the image.

In embodiments, selecting reliable intensity value pixels may comprise excluding pixels from at least a portion of a plurality of pixels that have at least one neighboring pixel that is not a member of the plurality of pixels.

In embodiments, the outer region of a histogram may comprise a first set of intensity values that are less than a lower bounding value and a second set of intensity values that are greater than an upper bounding value. In embodiments, the lower bounding value may be an average intensity value of the first set of reliable pixels minus a first value multiplied by a standard deviation of the first set of reliable pixels, and the upper bounding value may be the average intensity value of the first set of reliable pixels plus a second value multiplied by the standard deviation.

In embodiments, the data vector may be a bit vector, and decoding the data vector comprises removing an indicator prefix from the bit vector and extracting data by decoding the bit vector. In embodiments, decoding the bit vector may further comprise applying an error-correcting code decoder to the bit vector.

In embodiments, a system for extracting a set of data values from a set of ordered embedding sites, an embedding site comprising pixels, may comprise a bitstream extractor that extracts a set of data values. In embodiments, the system may further comprise an embedding site selector that identifies a set of embedding sites in the image; and an embedding site ordering processor that orders the set of embedding sites to obtain a set of ordered embedding sites.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 6 depicts constraints that may be used to select embedding sites according to various embodiments of the invention.

FIG. 7 depicts a method for assigning an order to identified embedding sites within an image according to various embodiments of the invention.

FIG. 18 depicts a constraint that may be used to select candidate embedding sites according to various embodiments of the invention.

FIG. 20 depicts a method for identifying an embed pattern in a candidate embedding site using cumulative density function according to various embodiments of the invention.

DETAILED DESCRIPTION OF THE PREFERRED EMBODIMENTS

Figure 1A:
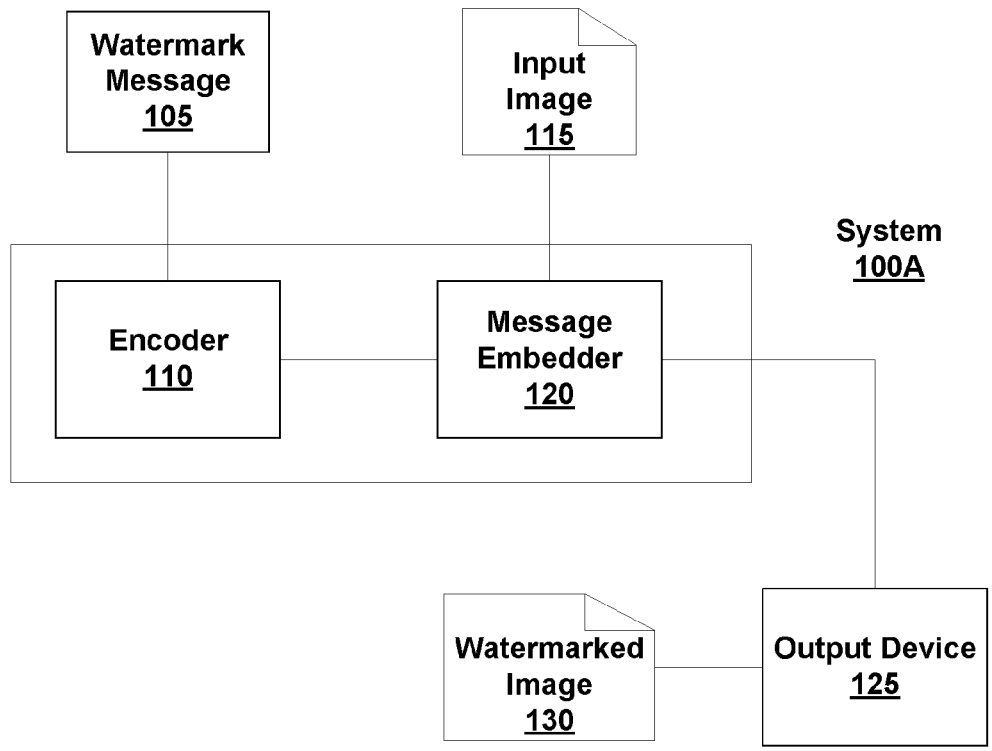
FIG. 1A depicts a block diagram of a system for embedding a watermark message into an image according to various embodiments of the invention.

Systems and methods are described for embedding and/or extracting data in images. In embodiments, an image may be segmented, and characters or other image groups may be identified. In embodiments, characters or other image groups may be determined to be embedding sites, which are ordered. In embodiments, the characters or other image groups may need to satisfy one or more constraint to qualify as an embedding site. Data may be bit encoded into a bit vector, which may be further encoded using an error-correcting code. Multiple instances of the bit vector may be written to a bitstream. Each bit of the bitstream may be embedded into a corresponding ordered embedding site by encoding the bit value as different intensity values assigned to the pixels within one portion of the embedding site relative to the pixels in another portion of the embedding site. In embodiments, data may be extracted from an image by identifying and ordering candidate embedding sites, extracting a bitstream by determining the bit values of the bits embedded into the embedding sites, segmenting the bitstream by parsing it into instances of a data vector, and decoding the data vector.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, multifunction devices, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment, or "embodiments" means that a particular feature, structure, characteristic, or function described in connection with the embodiment is included in at least one embodiment of the invention and may be in more than one embodiment. The appearances of the phrase "in one embodiment," "in an embodiment," or "in embodiments" in various places in the specification are not necessarily all referring to the same embodiment or embodiments.

A. System Implementations

FIG. 1A depicts a system 100A for embedding a watermarked message 105 into an input image 115 according to various embodiments of the invention. System 100A comprises an encoder 110 and a message embedder 120. An output device 125 may render the input image 115 containing the embedded encoded watermark message in order to generate a watermarked image 130. In certain embodiments, output device 125 may be a printer or may be a display, such as a computer screen.

In embodiments, encoder 110 receives a watermark message 105 ("M") and generates a bit vector representing the message in a bit-encoded format. In an embodiment, an indicator prefix ("A") is chosen to facilitate identification of the beginning of a message bit vector that has been embedded into an image. In certain embodiments, the character or characters in A may be chosen so that the bit representation of any character in A is different from any character in M.

In embodiments, the characters in message "AM" are bit encoded and represented by a bit vector. In certain embodiments, each character may be represented by an 8 bit encoding, (for example, a bit vector representing an 11 character message is 88 bits in length). In embodiments, the AM bit vector may be further encoded using an error-correcting code (hereafter, "ECC"). An example of an ECC is the Reed-Solomon code (hereafter, "RS"), which operates on multi-bit blocks such as, for example, 8-bit encoded characters. One skilled in the art shall recognize that other error correction codes or algorithms may be employed. In embodiments, ECC encoding will add a set of n parity bits ("P") to the AM bit vector, so that the encoded message bit vector represents "AMP," an ECC code word, and has a length equal to the bit-encoded message characters (the data part of the code word) plus the n parity bits. For example, an RS(255,223) code word contains 223 8-bit data symbols plus 32 8-bit parity bytes and can correct up to any 16 data symbol errors in the code word. One skilled in the art will recognize that the selection of an ECC depends on the encoding scheme and length of the AM bit vector, and the number and distribution within the code word of errors to be corrected. The selection of an ECC is not critical to the invention.

In embodiments, message embedder 120 receives a message bit vector and embeds it into an input image 115. In embodiments in which the input image 115 is an image of a document containing characters, an individual character may be identified as an "embedding site" into which a representation of a single bit from the bit vector may be embedded. In embodiments, a character may need to satisfy one or more constraints to qualify as an embedding site. In embodiments, the embedding sites within an input image 115 may be ordered. In embodiments in which the number of image embedding sites is greater than the length of the bit vector, multiple instances of the bit vector may be embedded into the image. In certain embodiments, the instances of the bit vector may be written into a bitstream. Each bit in the bitstream may be embedded into a corresponding embedding site. Embedding multiple instances of a message bit vector may improve the robustness of the image watermarking because it increases the likelihood of correctly extracting a watermark message even if a watermarked image is modified, for example, by cropping.

Figure 1B:
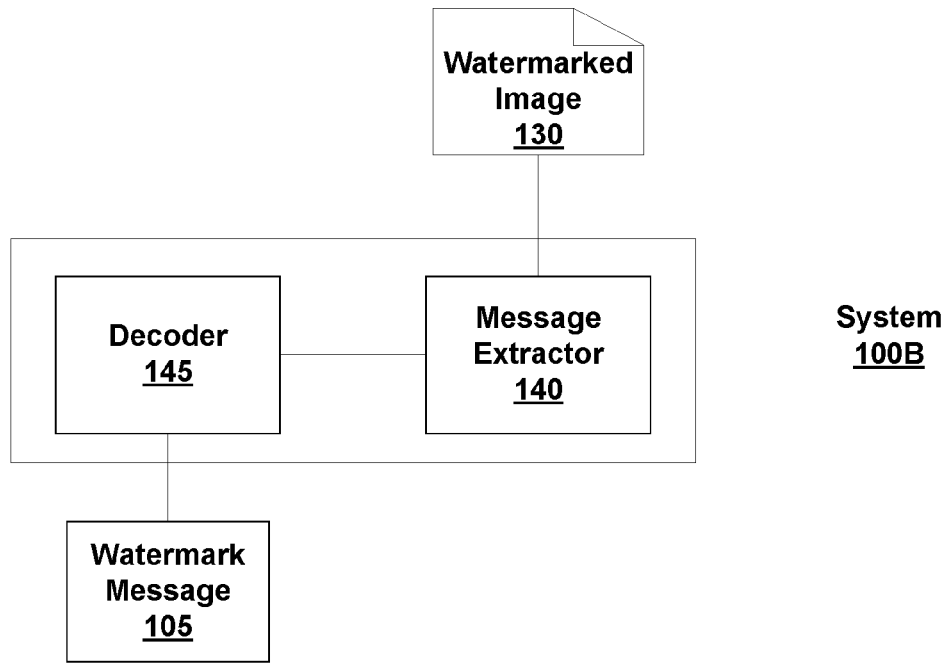
FIG. 1B depicts a block diagram of a system for extracting a watermark message from an image according to various embodiments of the invention.
Figure 1C:
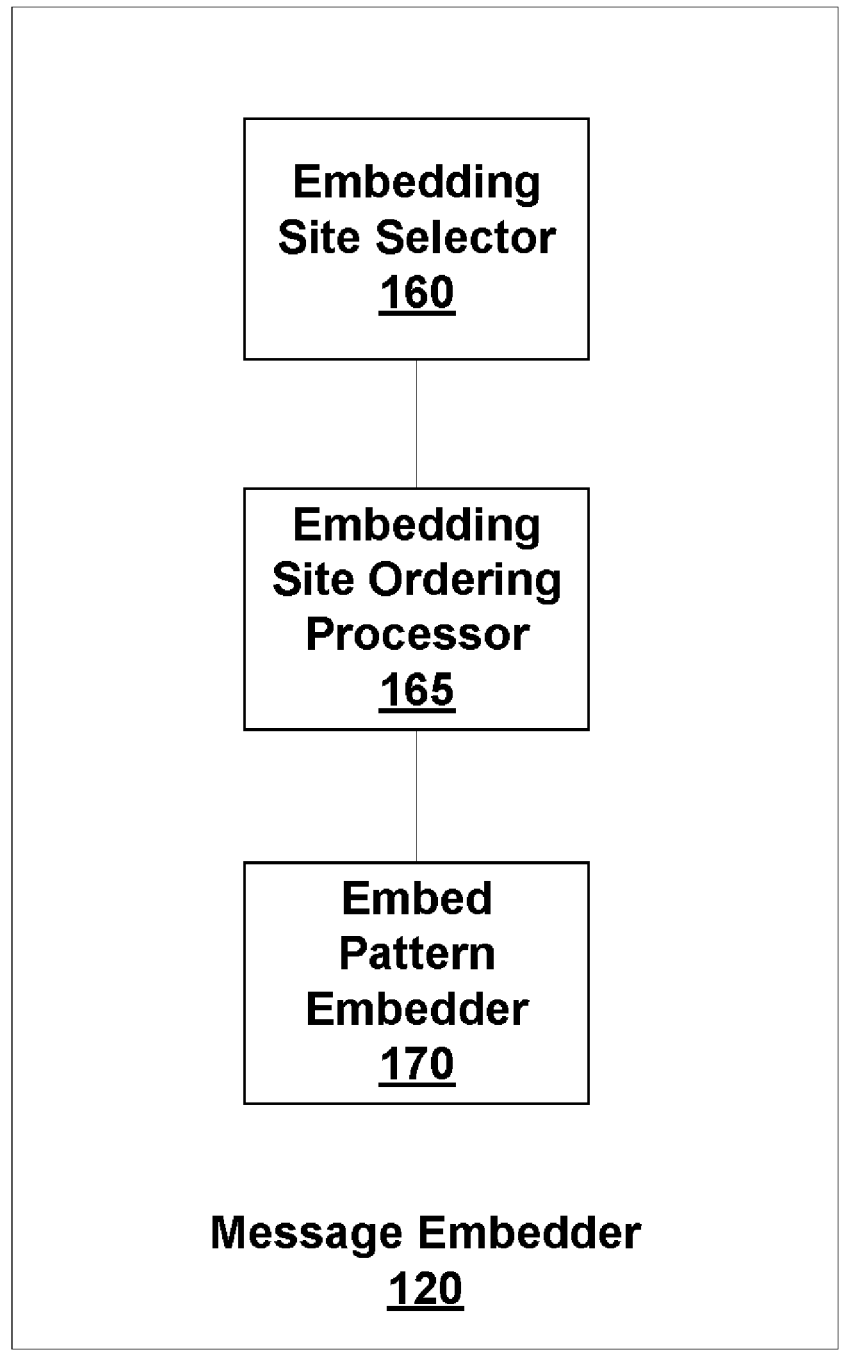
FIG. 1C depicts a block diagram of a message embedder, according to various embodiments of the invention.

FIG. 1C depicts a message embedder system 120 that comprises an embedding site selector 160, an embedding site ordering processor 165, and an embed pattern embedder 170.

In embodiments, embedding site selector 160 receives an input image 115 and performs an analysis of the image in order to select a set of embedding sites within the image. In embodiments, an image may be segmented to identify pixel groups. In embodiments, the pixel groups may be the foreground pixels that represent characters such as English letters, Japanese strokes, or line art, for example. In embodiments, an individual character may be identified as a bounded region of adjacent foreground pixels within the segmented image. In certain embodiments, a bounded region of adjacent foreground pixels is a "connected component" that is identified and labeled by performing a Connected Component Analysis (hereafter, "CCA") on pixels within the image. One skilled in the art will recognize that various methods of segmentation and CCA may be used and that no particular segmentation or CCA method is critical to the present invention.

In embodiments, each identified connected component within an image may be considered a candidate embedding site. Each connected component may be fitted with a "bounding box," which may be a rectangle with the minimum area that encloses the pixels labeled as belonging to that connected component. In certain embodiments, the bounding box may be an axis-aligned minimum area bounding box. That is, the bounding box may be aligned with a grid such as the image borders. In embodiments, constraints for selecting embedding sites from among the candidate embedding sites may be defined. In certain embodiments, the constraints may include one or more size constraints applied to bounding boxes. Candidate embedding sites that meet the constraints are selected as embedding sites.

In embodiments, embedding site ordering processor 165 receives the embedding sites identified for an input image 115 and orders the embedding sites. In embodiments, the embedding sites are ordered based on the coordinates of their bounding boxes. In embodiments, a grid may be applied to the image and the coordinates of a bounding box may be assigned according to its position on the grid. In alternative embodiments, the order of the bounding boxes may be assigned by applying sweep lines to the image. In embodiments in which the image contains text, a first sweep delimits text lines that may contain embedding sites, and then a second sweep is performed across each text line to identify and order each embedding site present on the line.

In embodiments, embed pattern embedder 170 receives a message bit vector and embeds the bits in the bit vector into the ordered sequence of embedding sites within an image 115. In embodiments, a bit is embedded into an embedding site by encoding its value as an "embed pattern" with different intensity values assigned to the pixels within one portion of an embedding site relative to the pixels in another portion of the embedding site. In certain embodiments, the relative portions may be the upper part and the lower part of the embedding site. In certain embodiments, embedding a bit value of 0 may assign an intensity value of 0 (black) to the pixels in the upper part and an intensity value of 80 (gray) to the pixels in the lower part, while embedding a bit value of 1 may assign an intensity value of 0 (black) to the pixels in the lower part and an intensity value of 80 (gray) to the pixels in the upper part.

Those skilled in the art will recognize that other relative portions, encoding schemes, and intensity differences may be selected for representing bit values. For example, the intensity differences may be selected such that the embedded message is invisible or nearly invisible to an observer while at the same time being more reliable for detection through image processing.

FIG. 1B depicts a system 100B for extracting a watermarked message 105 from a watermarked image 130 according to various embodiments of the invention. System 100B comprises a message extractor 140 and a decoder 145. In certain embodiments, the watermarked image 130 may have been generated by a scanner. An embodiment of system 100B is expected to share the encoding and embedding assumptions of an embodiment of system 100A that generated the watermarked image 130.

Figure 1D:
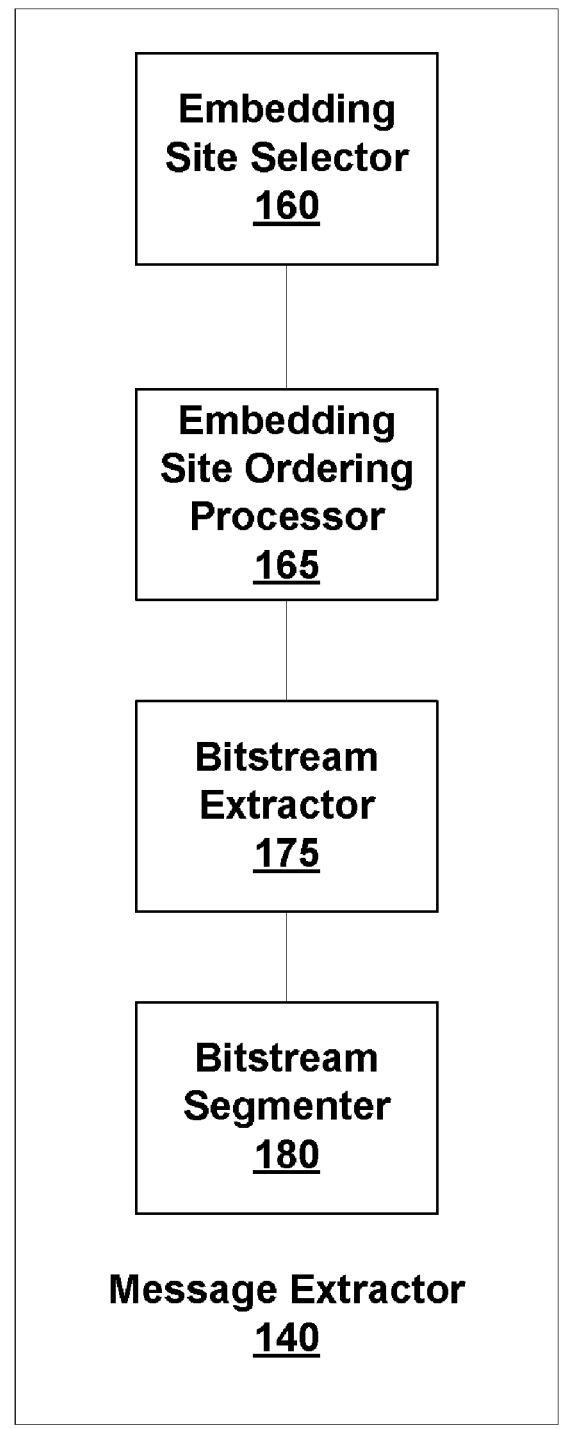
FIG. 1D depicts a block diagram of a message extractor, according to various embodiments of the invention.

In embodiments, message extractor 140 receives a watermarked image 130 and extracts one or more message bit vectors (or portions thereof) that have been embedded within the watermarked image 130. FIG. 1D depicts a an embodiment of message extractor system 140 that comprises an embedding site selector 160, an embedding site ordering processor 165, a bitstream extractor 175, and a bitstream segmenter 180.

In embodiments, an ordered sequence of embedding sites is identified within the watermarked image 130 according to embodiments of embedding site selector 160 and embedding site ordering processor 165 in embodiments of message embedder 120.

In embodiments of bitstream extractor 175, a bitstream is extracted from a watermarked image 130 by determining the bit values embedded into the ordered sequence of embedding sites. A bit value may be determined by first computing the average intensity values of the pixels within portions of an embedding site, and then computing the relative difference between those values to identify an embed pattern, if any. In various embodiments, the average intensity value may be the mean, median, or mode. In embodiments, the average intensity value may be a robust mean of a sample of pixels that is created by, for example, removing very light or dark pixels or removing boundary pixels. In certain embodiments, the portions may be the upper and lower parts of an embedding site. The intensity difference between the upper and lower parts is calculated, and if that intensity difference is greater than a threshold, an embed pattern is identified and a bit value is considered to have been embedded in the embedding site. For example, in embodiments using the bit value encoding scheme in the example described for message embedder 120, the bit value would be assigned "0" if the upper part of a connected component were darker by a threshold than its lower part, and the bit value would be assigned "1" if the upper part of a connected component were lighter by a threshold than its lower part. Comparing the intensity difference between portions of a connected component makes the method robust even if the intensity of the watermarked image has been modified through, for example, the half-tone effect produced by a printer.

In embodiments, of bitstream segmenter 180, the bitstream may be segmented by being parsed to extract instances of the message bit vector. In certain embodiments, identifying the bit encoded "A" indicator prefix facilitates identification of the beginning of a message bit vector within a bitstream. Since generation of the watermarked image 130 may have modified the image (for example, the watermarked image 130 may be a scanned image), parsing the image bitstream may not be performed using exact token matching. For example, in certain embodiments, parsing the bitstream may be performed by determining bitwise similarity between a candidate bit vector within the bitstream and the bit vector representing the bit encoded watermark message.

In embodiments, decoder 145 receives one or more bit vectors parsed from an image bitstream and outputs a watermark message 105. In embodiments in which the message bit vector was encoded using an ECC, the parity portion of the bit vector is used by the ECC decoder to correct errors that may be in the data portion of the bit vector. One example of such errors is swapped bits that may be a result of a process (for example, printing and/or scanning) that generated the watermarked image 130. In embodiments, a corrected bit vector may be a bit-encoded message and its indicator prefix ("AM"). The watermark message may be generated by removing the prefix "A" and decoding the characters in the "M" portion of a bit vector.

Figure 1E:
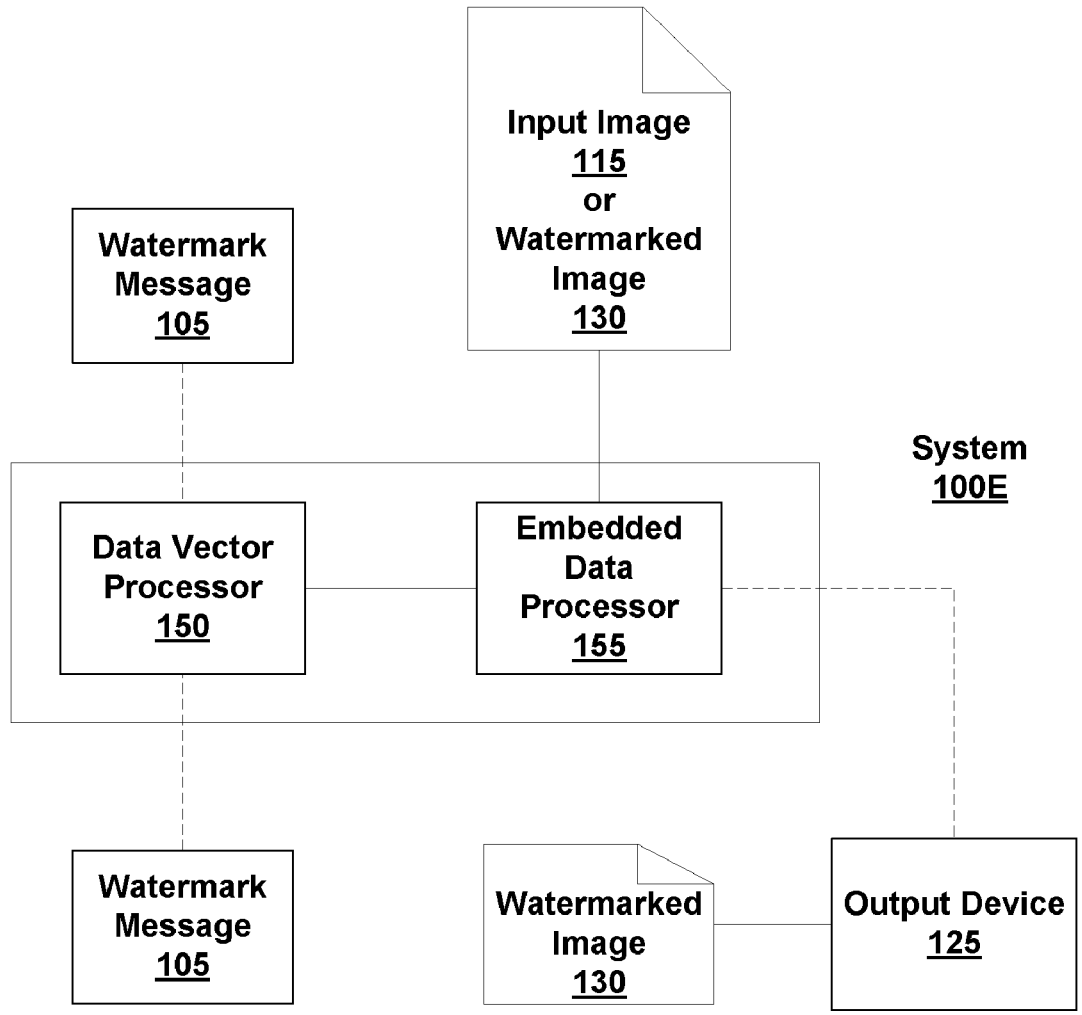
FIG. 1E depicts a block diagram of a system for embedding a watermark message into an image and extracting a watermark message from an image, according to various embodiments of the invention.

FIG. 1E depicts a system 100E for embedding a watermarked message 105 into an input image 115 and extracting a watermarked message 105 from a watermarked image 130 according to various embodiments of the invention. System 100C comprises a data vector processor 150 and an embedded data processor 155. An output device 125 may render the input image containing the embedded encoded watermark message in order to display a watermarked image 130.

In embodiments, data vector processor 150 comprises encoder 110 and decoder 145. In embodiments, embedded data processor 155 comprises message embedder 120 and message extractor 140.

B. Methods for Embedding a Watermark Message into an Image

Figure 2:
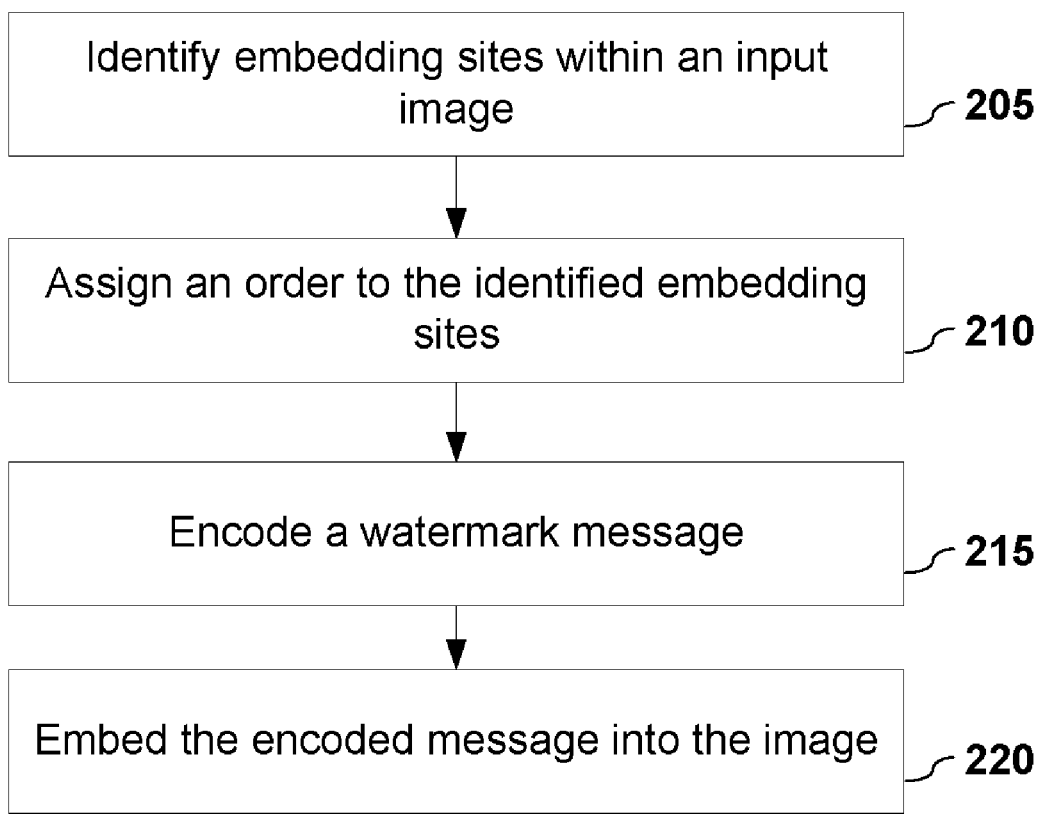
FIG. 2 depicts a method for embedding a watermark message into an image according to various embodiments of the invention.

FIG. 2 depicts a method 200 for embedding a watermark message into an image according to embodiments of the invention. Method 200 comprises the steps of identifying embedding sites within an input image (205), assigning an order to the identified embedding sites (210), encoding a watermark message (215), and embedding the encoded message into the image (220). Method 200 may be implemented by embodiments of system 100A and embodiments of system 100E.

In embodiments a group of pixels may be identified as an "embedding site" into which a representation of a single bit from the bit vector may be embedded. In embodiments, embedding sites within an image may be ordered. In embodiments in which the number of image embedding sites is greater than the length of the bit vector, multiple instances of the bit vector may be embedded into the image. In certain embodiments, the instances of the bit vector may be written into a bitstream. Each bit in the bitstream is embedded into a corresponding embedding site. Embedding multiple instances of a message bit vector may improve the robustness of the image watermarking because it increases the likelihood of extracting a watermark message even if a watermarked image is modified by, for example, cropping.

1. Identification of Embedding Sites within an Image

Figure 3:
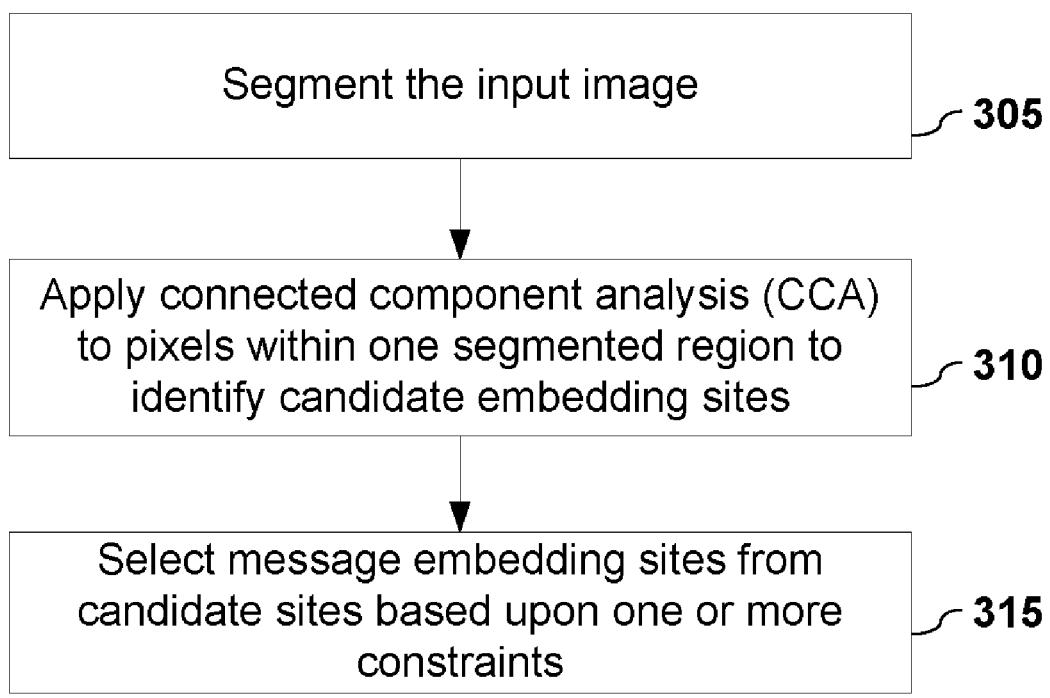
FIG. 3 depicts a method for identifying embedding sites within an image according to various embodiments of the invention.

FIG. 3 depicts a method 300 for identifying embedding sites within an image according to embodiments of the invention. Method 300 may be implemented as step 205 of embodiments of method 200 and in embodiments of embedding site selector 160.

In embodiments, an image may be segmented (step 305) to identify regions of interest. For purposes of illustration, an example of processing an image containing characters will be used in the description of this method. Those skilled in the art will recognize that that the present invention may be applied to a variety of images and is not limited to this example. In embodiments, an image containing text may be segmented into two regions: a foreground region that contains the text, and a background region. In embodiments, the foreground pixels (the pixels in the foreground region) may represent characters such as English letters or Japanese strokes.

In embodiments, a bounded region of adjacent pixels within a region of a segmented image is a "connected component" that may be identified and labeled by performing a connected component analysis (hereafter, "CCA") on each pixel within the image (step 310). In certain embodiments, a CCA may be applied to dilated foreground pixels. In embodiments, CCA may be performed by using a morphological dilation operation iteratively using a 3-by-3 dilation object. One skilled in the art will recognize that various methods of segmentation and CCA may be used and that no particular segmentation or CCA method is critical to the present invention. In embodiments, multiple connected components may be grouped into a single candidate embedding site if the distance between the pixels on their boundaries is less than a threshold such as, for example, a couple of pixels.

In embodiments, each identified connected component within an image may be considered a candidate embedding site. Each connected component may be fitted with a "bounding box," which may be a rectangle with the minimum area that encloses the pixels labeled as belonging to that connected component. In certain embodiments, the bounding box may be an axis-aligned minimum area bounding box. That is, the bounding box may be aligned with a grid such as the image borders.

In embodiments, an embed pattern may be represented as different intensity values assigned to one set of pixels (e.g. foreground pixels) within one portion of an embedding site relative to the pixels in another portion of the embedding site. As an image is processed, the overall image characteristics may be altered in ways that may impede detection of an embed pattern. For example, printing of an image may introduce halftones that may mitigate intensity differences. Modifications such as scaling and cropping of an image may alter the size and shape of embedding sites and thus might affect detection of different regions within an embedding site. Thus, in embodiments, not all candidate embedding sites may be optimal embedding sites to use for a robust method of embedding data within an image.

In embodiments, constraints for selecting embedding sites from among the candidate embedding sites may be defined. In certain embodiments, the constraints may include one or more size constraints applied to bounding boxes. Candidate embedding sites that meet the constraints are selected as possible embedding sites (step 315).

a) Constraint-Based Selection of Embedding Sites

Figure 4:
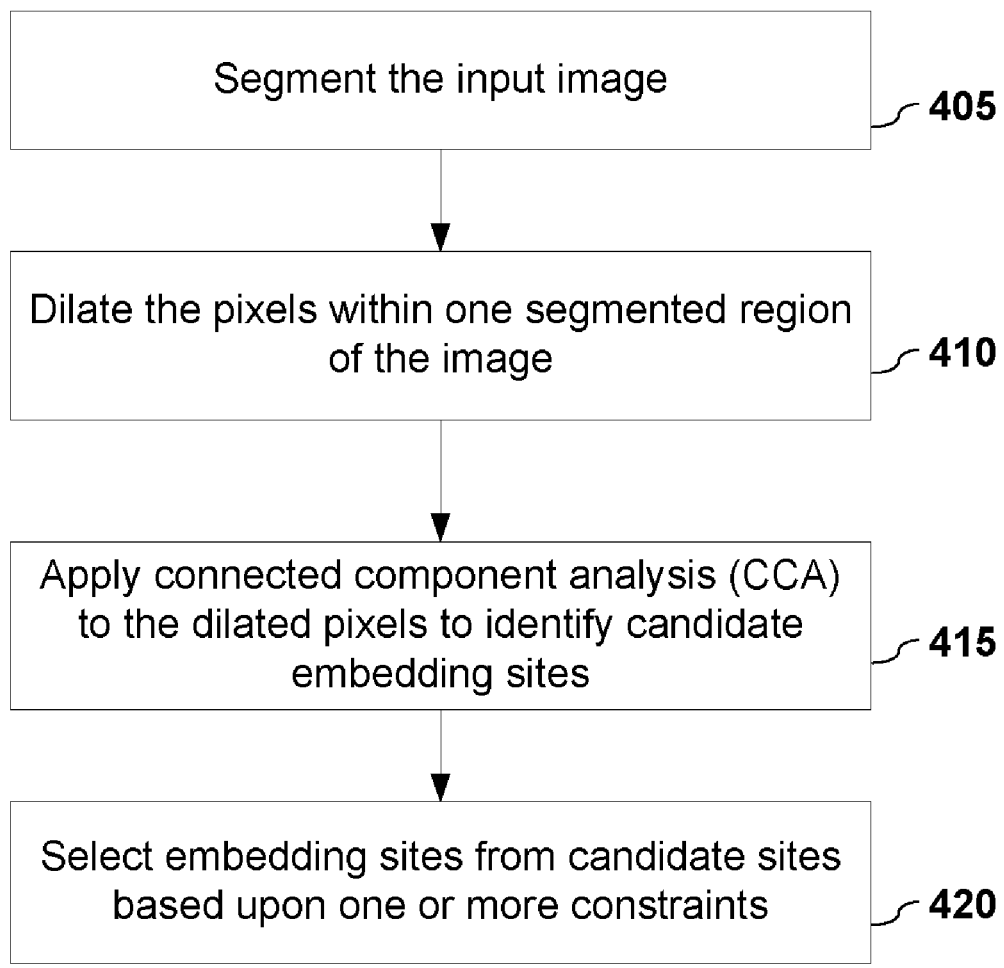
FIG. 4 depicts a method for selecting embedding sites from candidate sites according to various embodiments of the invention.

FIG. 4 depicts a method 400 for constraint-based selection of a site into which to embed data according to embodiments of the invention. Method 400 may be implemented as an embodiment of method 300, and by embodiments of embedding site selector 160. Method 400 comprises the steps of segmenting an image into different regions (405), dilating the pixels of a segmented region of the image (410), applying connected component analysis to the dilated pixels to identify candidate embedding sites (415), and selecting embedding sites from the candidate embedding sites (420). In embodiments, steps 405 and 415 of method 400 may be the same as steps 305 and 315 that have been previously disclosed for method 300.

In embodiments, a dilation operation may be applied to the foreground pixels to enhance the boundaries of the segmented foreground region (step 410). Those skilled in the art will recognize that various types and sizes of dilation objects may be used in a dilation operation. In embodiments, the CCA may be applied to the dilated pixels (step 415).

In step 420 of method 400, one or more constraints may be applied to at least one characteristic of a candidate embedding site in order to select an embedding site that will improve the likelihood of detection of an embed pattern that has been applied to it.

Figure 5:
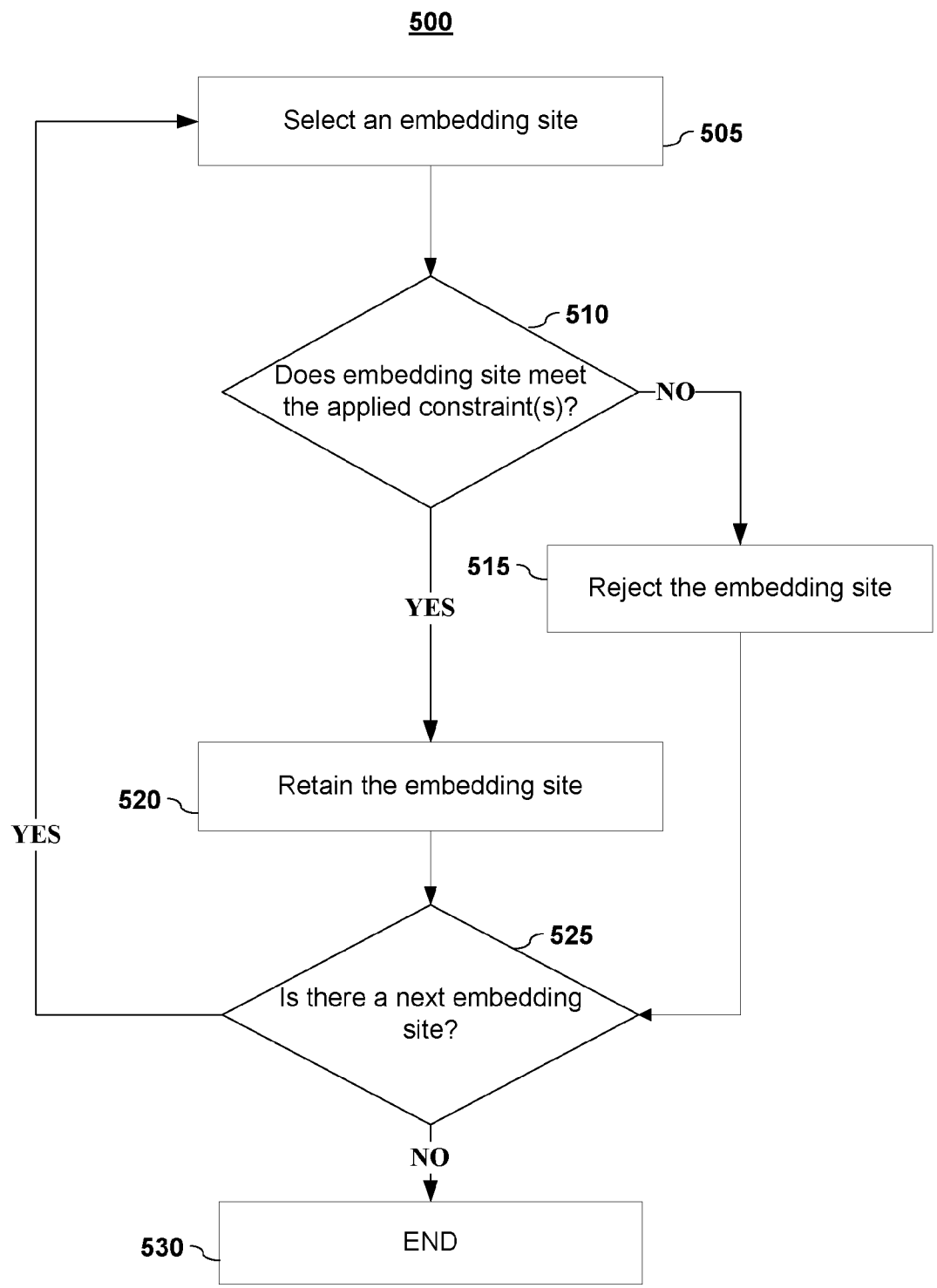
FIG. 5 depicts a method for applying constraints to select embedding sites according to various embodiments of the invention.

FIG. 5 depicts a method 500 for selecting a set of embedding sites from a set of candidate embedding sites according to embodiments of the invention. Method 500 may be implemented as step 420 in embodiments of method 400.

In embodiments, candidate embedding sites may be examined to determine their suitability as embedding sites. In embodiments, each site (step 505) in the set of sites (steps 525 and 530) is examined. One or more constraints may be applied to at least one characteristic of a candidate site (step 510). A candidate site is determined to be an adequate embedding site if it meets the applied constraint(s) (step 520). If a candidate site fails to meet the applied constraint or constraints, it is rejected as a possible embedding site (step 515).

(i) Embedding Site Selection Constraints Embodiments

FIG. 6 depicts embodiments of constraints (600) that may be applied to a candidate embedding site to determine if it may be used as an embedding site. These constraints may be applied in step 510 in embodiments of method 500. In embodiments, one or more of these constraints may be applied to the set of candidate embedding sites that have been identified for an image. Those skilled in the art will recognize that a variety of constraints may be applied to a variety of candidate embedding site characteristics, and that these constraints do not limit the scope of this invention. In embodiments, the constraints 600 are applied to the bounding box fitted to the connected component of the candidate embedding site.

Constraint 605 is an embodiment of a size constraint. In embodiments, a candidate embedding site is retained as an embedding site if the width and height of its bounding box exceed a threshold. For example, in an embodiment using an input image on the order of 4800-by-6818 pixels in size, a threshold value may be a bounding box of 45-by-45 pixels in size. In embodiments, the width and height values may have to exceed different threshold values, such as a width threshold and a height threshold.

Constraint 610 is a shape constraint. In embodiments, a shape factor constant c that is greater than zero and less than one may be set. In embodiments, a candidate embedding site is rejected if its bounding box width is less that the product of its bounding box height and c:

$$\text{if width} < (\text{height} * c) \text{ then reject site} \tag{1}$$

or its bounding box height is less that the product of its bounding box width and c:

$$\text{if height} < (\text{width} * c) \text{ then reject site} \tag{2}$$

In embodiments, the value of c may be different between equation (1) and equation (2).

Constraint 615 is an embodiment of a complexity constraint. In embodiments, a candidate embedding site is rejected if any corner of its bounding box is inside the bounding box of at least one other embedding site. In embodiments, all intersecting candidate embedding sites are rejected.

2. Ordering Embedding Sites within an Image

FIG. 7 depicts a method 700 for ordering embedding sites within an image according to embodiments of the invention. Method 700 may be implemented as step 210 of embodiments of method 200 and in embodiments of embedding site ordering processor 165.

In embodiments, the embedding sites identified for an image are ordered based on the coordinates of their bounding boxes. In embodiments, a grid may be applied to the image and the coordinates of a bounding box may be assigned according to its position on the grid. In alternative embodiments, the coordinates of the bounding boxes may be assigned by applying sweep lines to the image. In embodiments in which the image contains text, a first sweep delimits text lines that may contain embedding sites, and then a second sweep is performed across each text line to order each embedding site present on the line.

In embodiments in which the image contains text, text lines may be determined by vertically sweeping a horizontal line from the image top to the image bottom (step 705). A text line is identified as the region covered by a set of sequential horizontal sweep lines that cover pixels from connected components. The text line is delimited when the next vertical sweep of the horizontal line does not cover any pixels from a connected component. In an embodiment, the lines may be obtained by examining a histogram of foreground pixels where the histogram segments/boxes represent the rows of the image.

Figure 8:
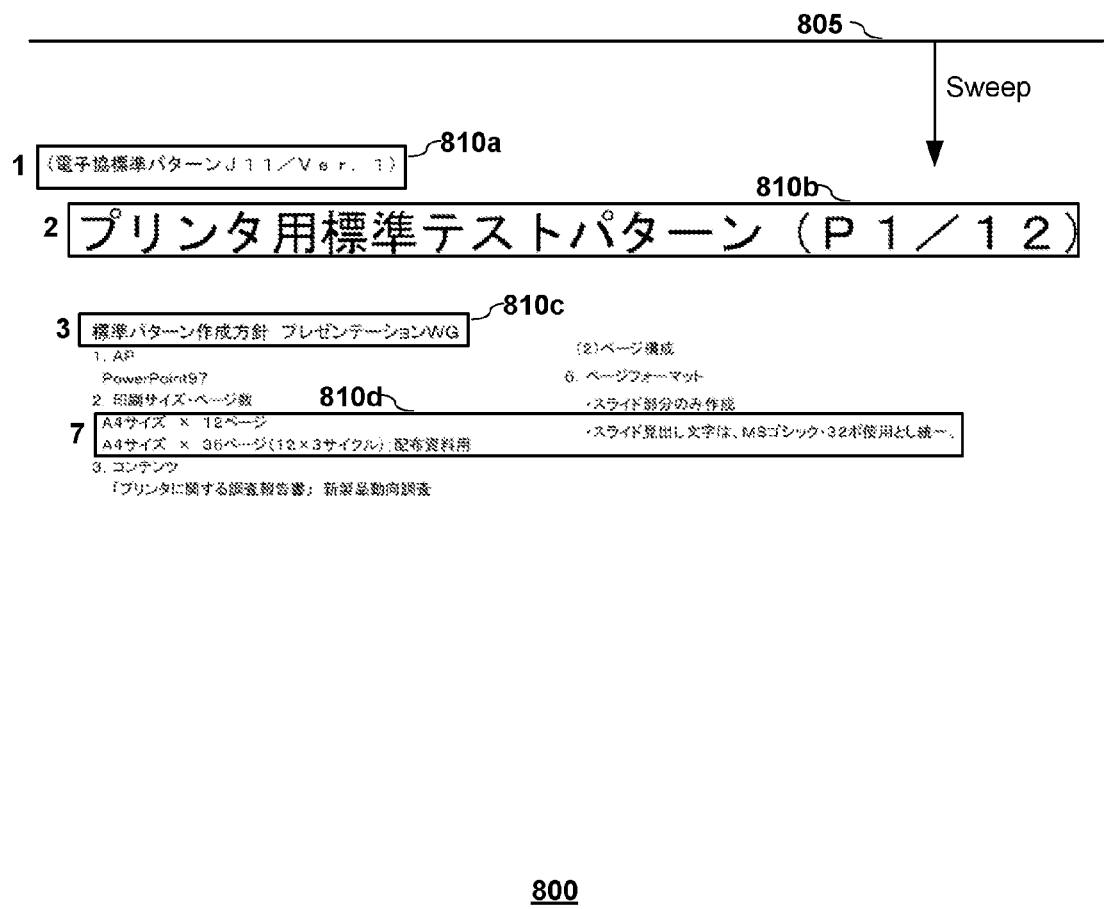
FIG. 8 illustrates an example of assigning an order to text lines within an image according to various embodiments of the invention.

Illustrated in FIG. 8 is an example 800 of ordering text lines within a document image according to an embodiment. In embodiments, a vertical sweep of horizontal line 805 is performed from the top of the image to the bottom of the image. For illustration purposes, boxes have been drawn around delimited text lines (810a-d). The ordering of the lines follows the direction of the sweep; the number at the left of each box identifies its line order. In this example, box 810a surrounds the first line in order, and box 810c surrounds the third line in order. Box 810d (surrounding the seventh line in order) illustrates that a region containing 3 lines of text has been delimited as a single text line in the sweep because the horizontal sweep line did not meet the constraint of covering no pixels in connected components until after it had swept below the second line of text, that starts with "A4 . . . ".

In embodiments, a decision about the ordering of text lines may be made based on the number of text lines delimited as a result of the sweep. For example, in embodiments, after completing a vertical sweep of a horizontal line from the top of the image to the bottom of the image, the image may be rotated by an angle of 90 degrees, and step 705 may be repeated using the rotated image. The direction used for ordering of text lines may be chosen based on the sweep that delimited the greater number of lines. Those skilled in the art will recognize that the selection of an angle of rotation is not critical to the invention.

Figure 9:
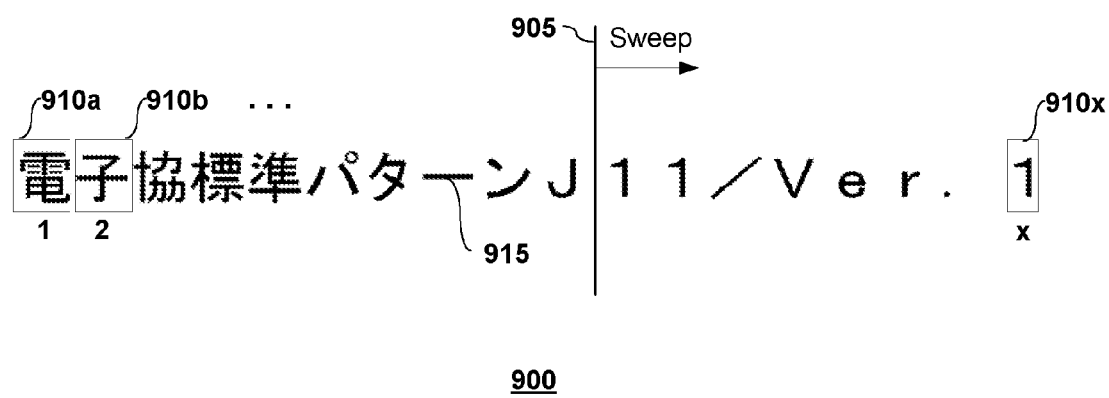
FIG. 9 illustrates an example of assigning an order to embedding sites within a text line according to various embodiments of the invention.

In embodiments, the embedding sites on each text line are ordered by sweeping a vertical line horizontally across a line from the beginning embedding site bounding box on the line to the last embedding site bounding box on the line (right to left) (step 710). Illustrated in FIG. 9 is an example 900 of ordering embedding site bounding boxes within a text line of an image according to an embodiment. A horizontal sweep of a vertical line 905 is performed from the beginning of the text line to the end of the text line. For illustration purposes, boxes approximating bounding boxes (910a-x) have been drawn around embedding sites. In this example, site 910a is the first site on the line in order, site 910b is the second site, and site 910x is the last site on the line in order. It should be noted that this ordering applies to embedding sites fitted with bounding boxes that have met the constraints. Candidate embedding site 915 is not ordered in this example because it was excluded as an embedding site due to a size constraint.

Figure 10:
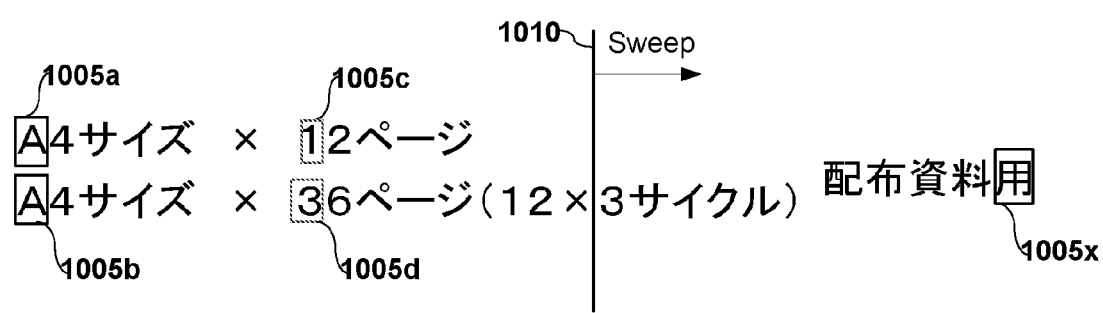
FIG. 10 illustrates an example of assigning an order to embedding sites within a delimited text line that contains characters from multiple text lines according to various embodiments of the invention.

Illustrated in FIG. 10 is an embodiment of ordering embedding site bounding boxes within a delimited text line that spans multiple lines of text according to an embodiment. A horizontal sweep of a vertical line 1010 is performed from the beginning of the text line to the end of the text line. For illustration purposes, boxes approximating bounding boxes (1005a-x) have been drawn around embedding sites. In embodiments, if a vertical line sweeps across two embedding sites whose bounding boxes that are in vertical alignment (1005a and 1005b), only one of the embedding sites (e.g. 1005a) is ordered. However, if the two embedding sites' bounding boxes are not vertically aligned, they both are ordered according to the order in which they are covered by the sweep line. In the example, embedding site 1005d is ordered before embedding site 1005c. Embedding site 1005x is ordered last in the line. In alternative embodiments, if two or more bounding boxes are aligned (e.g. a vertical line intersects the boxes), only one of the embedding sites may be selected.

One skilled in the art will recognize that the sweep lines may be selected to have any thickness and length, and that the order and direction of sweeping is not critical to the present invention. After steps 1005 and 1010 of method 1000, the embedding sites of an image will be ordered from the top left to the bottom right of the image.

3. Encoding a Watermark Message

Figure 11:
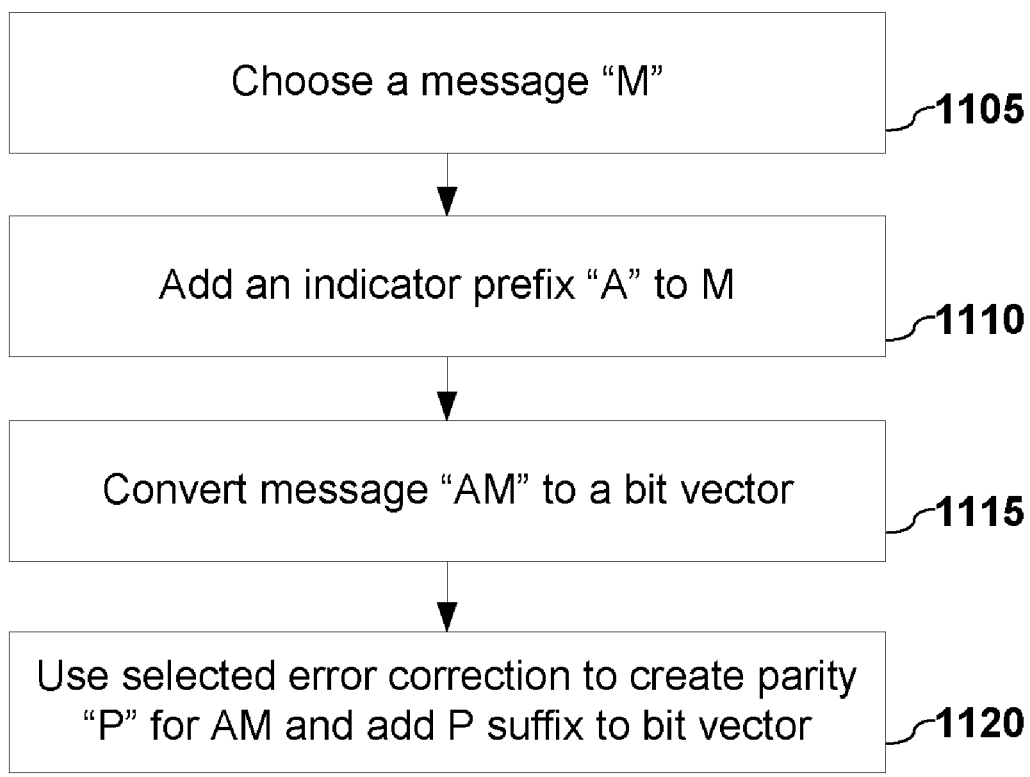
FIG. 11 depicts a method for encoding a watermark message according to various embodiments of the invention.

FIG. 11 depicts a method 1100 for encoding a watermark message according to embodiments of the invention. Method 1100 may be implemented as step 215 of embodiments of method 200 and in embodiments of encoder 110.

Once a message ("M") is chosen (step 1105), an indicator prefix ("A") is chosen or may be pre-selected (step 1110). In certain embodiments, the characters in A are chosen so that the bit representation of any character in A is different from any character in M. In embodiments, the indicator prefix A may facilitate identification of the beginning of a message bit vector that has been embedded into an image.

In embodiments, the characters in message "AM" are bit encoded and represented by a bit vector (step 1115). In certain embodiments, each character may be represented by an 8-bit encoding (for example, a bit vector representing an 11 character message is 88 bits in length). In embodiments, the AM bit vector may be further encoded using an error-correcting code (hereafter, "ECC") (step 1120). An example of an ECC is the Reed-Solomon code (hereafter, "RS"), which operates on multi-bit blocks such as, for example, 8-bit encoded characters. In embodiments, ECC encoding will add a set of n parity bits ("P") to the AM bit vector, so that the encoded message bit vector represents "AMP," an ECC code word, and has a length equal to the bit-encoded message characters (the data part of the code word) plus the n parity bits. For example, an RS(255,223) code word contains 223 8-bit data symbols plus 32 8-bit parity bytes and can correct up to any 16 data symbol errors in the code word. One skilled in the art will recognize that the selection of an ECC may depend on the encoding scheme and length of the AM bit vector, and the number and distribution within the code word of errors to be corrected. The selection of an ECC is not critical to the invention.

4. Embedding Message Bits into an Image

Figure 12:
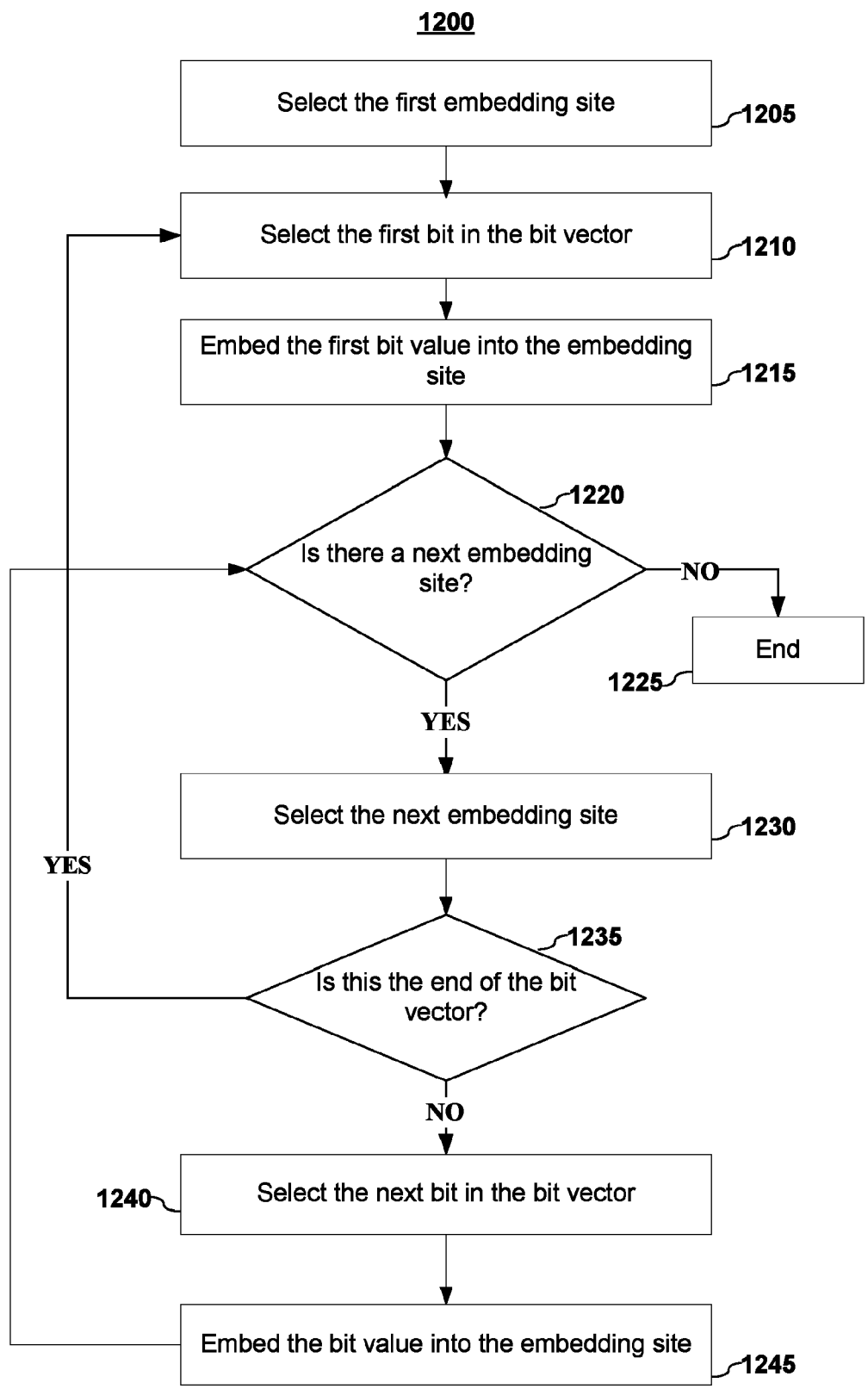
FIG. 12 depicts a method for embedding an encoded watermark message into an image according to various embodiments of the invention.

FIG. 12 depicts a method 1200 for embedding message bits into an image according to embodiments of the invention. Method 1200 may be implemented as step 220 of embodiments of method 200, and in embodiments of embed pattern embedder 170.

In embodiments, the bits in the bitstream are embedded into the ordered sequence of embedding sites within an image. The first ordered embedding site (step 1205) is embedded with an embed pattern corresponding to the bit value of the first bit (step 1210) in the bitstream (step 1215). Each successive bit in the bitstream is embedded into the corresponding next ordered embedded site in the image (steps 1220, 1230, 1240, and 1245) until there are no more embedding sites (step 1225). In embodiments in which there are multiple instances of the message bit vector that have been written to the bitstream, the message bit vector is repeatedly embedded into the next set of embedding sites (step 1235). Those skilled in the art will recognize that the number of embedding sites available within an image may be used to determine the number of complete instances of a message bit vector that can be written into a bitstream.

a) Embedding a Bit Value into an Embedding Site

Figure 13:
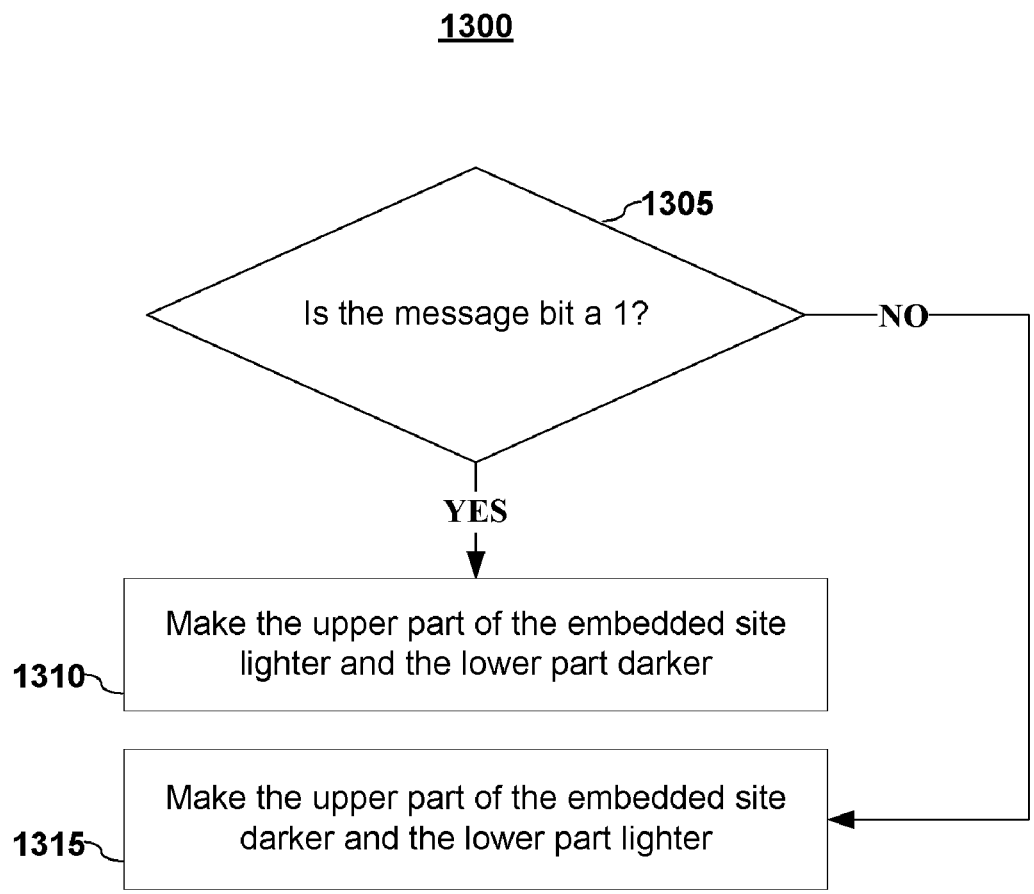
FIG. 13 depicts a method for embedding a bit value into an embedding site according to various embodiments of the invention.

FIG. 13 depicts a method 1300 for embedding a bit value into an embedding site according to embodiments of the invention. Method 1300 may be implemented as steps 1215 and 1245 of embodiments of method 1200.

In embodiments, a bit is embedded into an embedding site by encoding its value as an embed pattern with different intensity values assigned to the pixels within one portion of an embedding site relative to the pixels in another portion of the embedding site. In certain embodiments, the relative portions may be the upper part and the lower part of the embedding site (steps 1310 and 1315). In certain embodiments, embedding a bit value of 0 may assign an intensity value of 0 (black) to the pixels in the upper part and an intensity value of 80 (gray) to the pixels in the lower part, while embedding a bit value of 1 may assign an intensity value of 0 (black) to the pixels in the lower part and an intensity value of 80 (gray) to the pixels in the upper part. Those skilled in the art will recognize that other relative portions, encoding schemes, and intensity differences may be selected for representing bit values.

Figure 14:
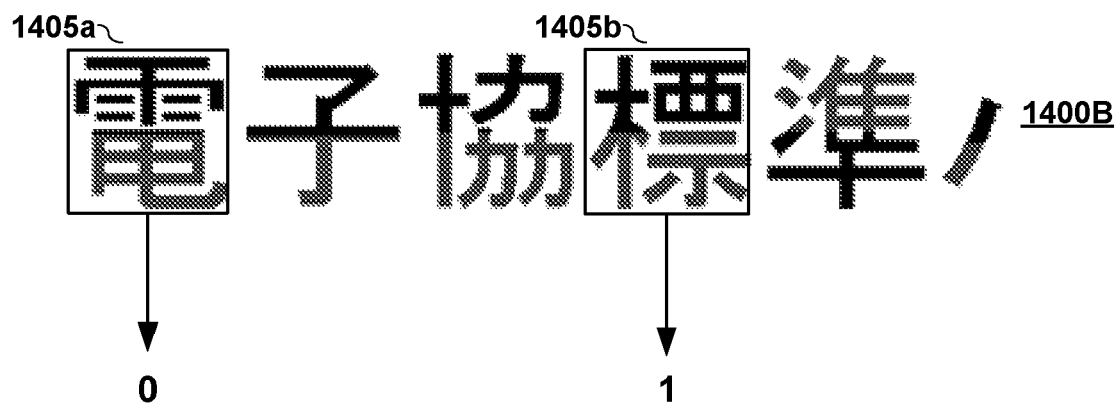
FIG. 14 illustrates an example of characters containing embedded bits according to various embodiments of the invention.

Illustrated in FIG. 14 is an example of bit values embedded into text embedding sites according to an embodiment of the invention. A portion of text is illustrated in 1400A, and the same portion of text with embedded bit values is illustrated in 1400B. The bit value encoding scheme is similar to the example described for method 1300. Boxes 1405a and 1405b illustrate individual embedding sites in the text. Box 1405a has an embedded bit value of 0 (lower portion is lighter), and box 1405b has an embedded bit value of 1 (upper portion is lighter).

In embodiments, the embed pattern representing a bit value may be enhanced by applying morphological dilation to the pixels in the lighter region of an embedding site, making the embedding site thicker in that region. In embodiments, this enhancement may be applied to all embedded data values within an image.

C. Methods for Extracting a Watermark Message from an Image

Figure 15:
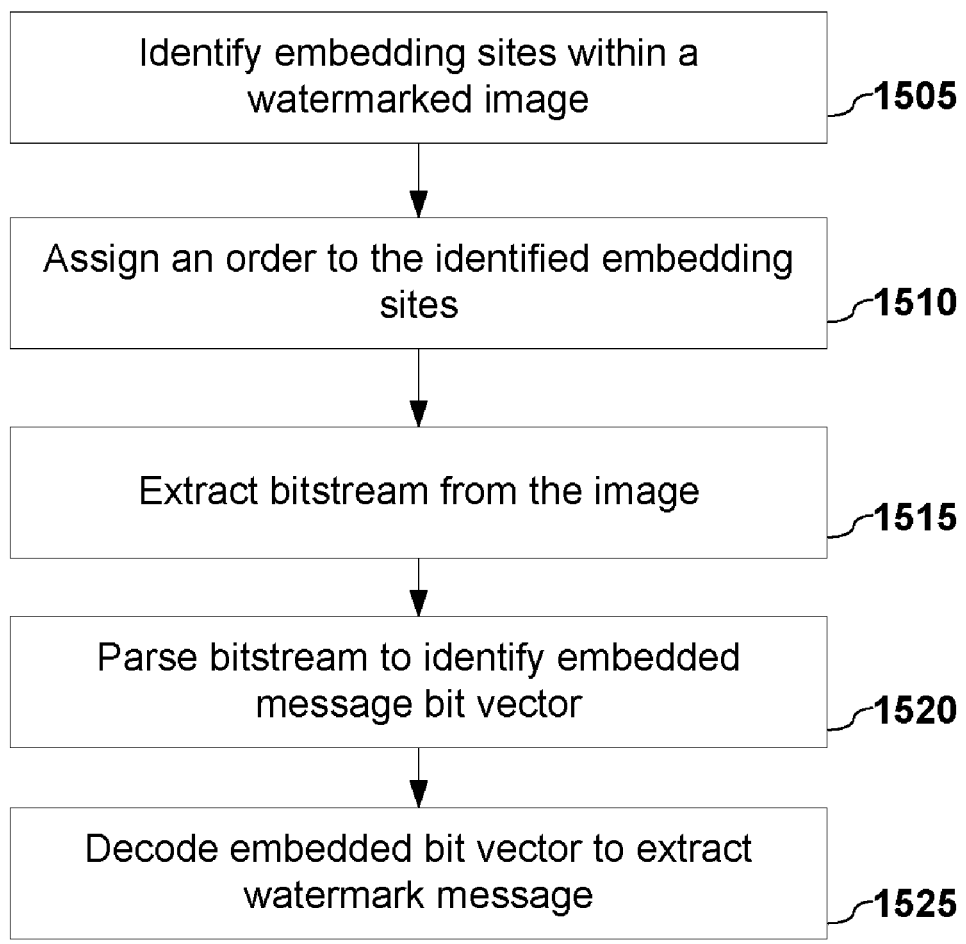
FIG. 15 depicts a method for extracting a watermark message from an image according to various embodiments of the invention.

FIG. 15 depicts a method 1500 for extracting a watermark message from an image according to embodiments of the invention. Method 1500 comprises the steps of identifying embedding sites within an input image (1505), assigning an order to the identified embedding sites (1510), extracting a bitstream from the image (1515), parsing the bitstream to identify an embedded message bit vector (1520), and decoding the embedded bit vector to extract the watermark message (1525). Method 1500 may be implemented by embodiments of system 100B and embodiments of system 100E.

1. Identifying and Ordering Embedding Sites within an Image

Step 1505 may be implemented as embodiments of method 300 for identifying embedding sites within an image, and step 1510 may be implemented as embodiments of method 700 for assigning an order to the identified embedding sites within an image.

a) Constraint-Based Selection of Candidate Embedding Sites

Figure 16:
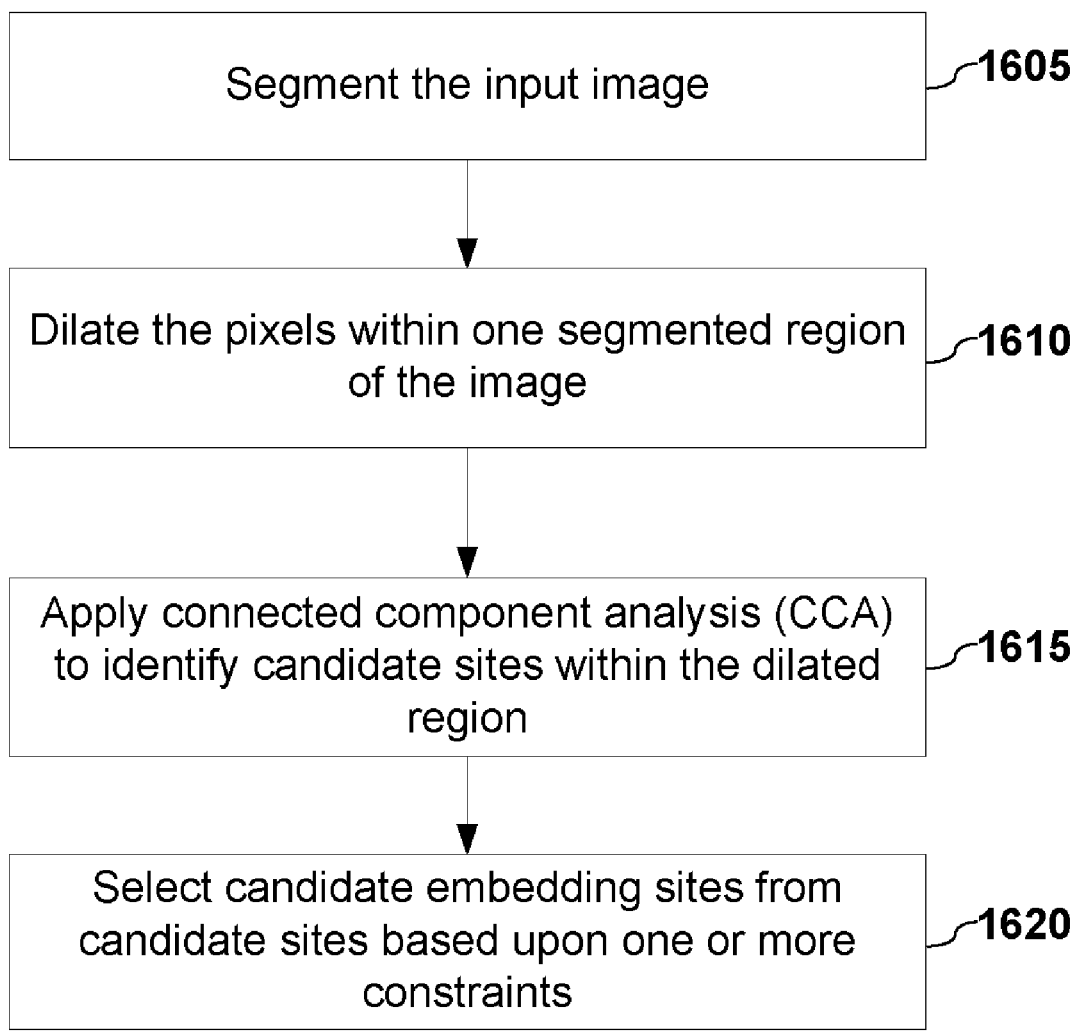
FIG. 16 depicts a method for selecting candidate embedding sites from candidate sites according to various embodiments of the invention.

FIG. 16 depicts a method 1600 for selecting a site from which to extract data according to embodiments of the invention. Method 1600 comprises the steps of segmenting an image (1605) into regions (such as foreground and background regions), dilating the pixels within one segmented region of the image (1610), identifying candidate sites from connected components that have been identified from the dilated pixels (1615), and selecting candidate embedding sites from the candidate sites (1620). Method 1600 may be implemented as embodiments of step 1505 in method 1500.

(i) Identification of Candidate Sites within an Image

In embodiments, the identification of candidate sites from which to extract embed patterns within an image is based on the same or similar processes used to identify candidate sites in which to embed data within an image. Thus, in embodiments, steps 1605, 1610, and 1615 of method 1600 may be the same as steps 405, 410, and 415 that have been previously disclosed for method 400.

(ii) Selection of Candidate Embedding Sites from Candidate Sites

In embodiments, there typically is no a priori knowledge of which candidate sites contain embed patterns. In step 1620 of method 1600, one or more constraints may be applied to the set of candidate sites in order to select a set of the most likely candidate embedding sites. Candidate embedding sites that are determined to contain an embed pattern are identified as embedding sites. In embodiments, embed patterns may be extracted from the set of embedding sites.

Figure 17:
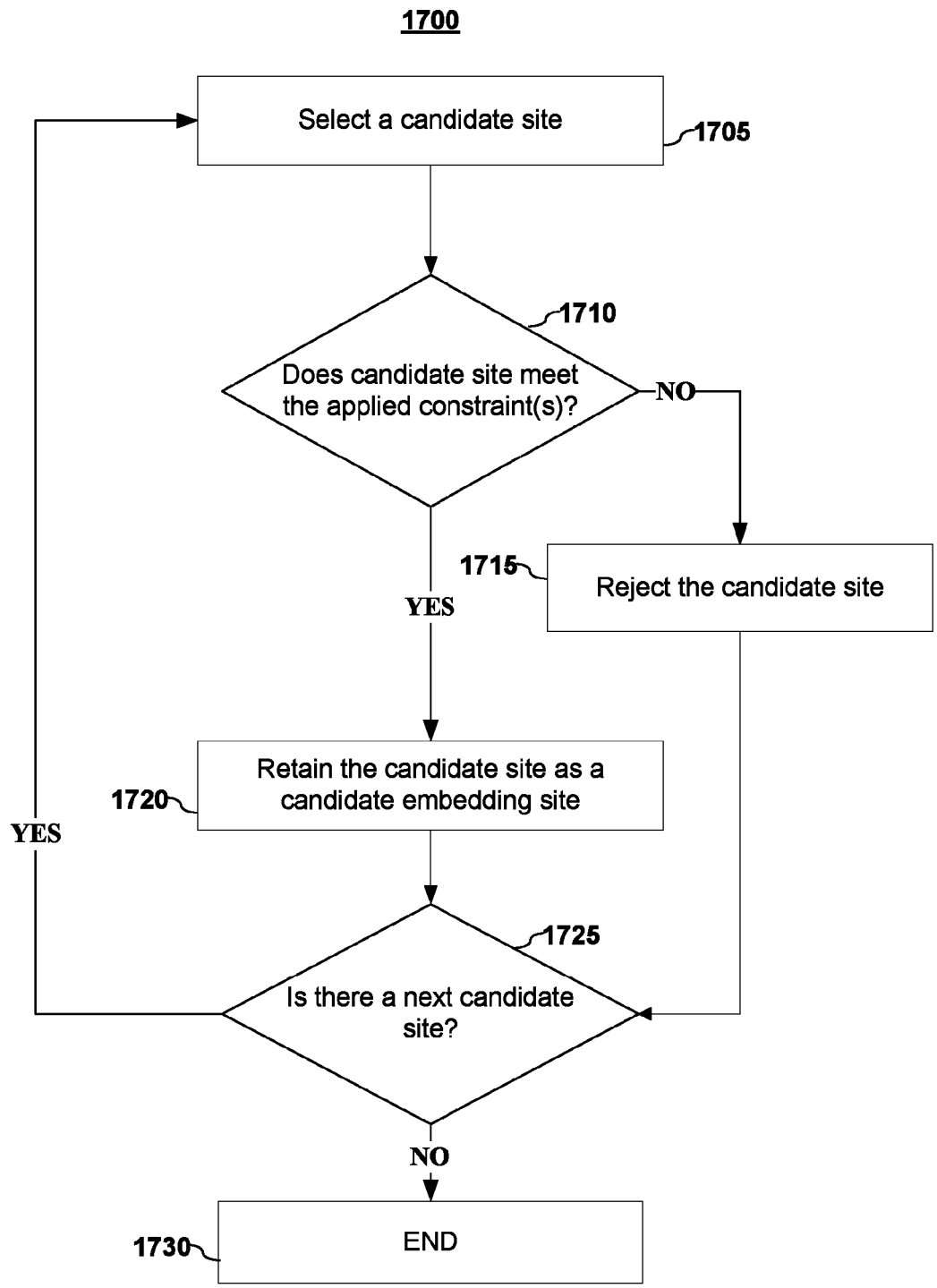
FIG. 17 depicts a method for applying constraints to select candidate embedding sites according to various embodiments of the invention.

FIG. 17 depicts a method 1700 for selecting a set of candidate embedding sites from a set of candidate sites according to embodiments of the invention. Method 1700 may be implemented as step 1620 in embodiments of method 1600.

In embodiments, candidate sites may be examined to determine their suitability as candidate embedding sites. Each site (step 1705) in the set of sites (steps 1725 and 1730) is examined. One or more constraints may be applied to at least one characteristic of a candidate site (step 1710). A candidate site is determined to be an adequate candidate embedding site if it meets the applied constraint(s) (step 1720). If a candidate site fails to meet the applied constraint or constraints, it is rejected as a candidate embedding site (step 1715).

FIG. 18 depicts an embodiment of a constraint (1800) that may be applied to a candidate site to determine if it may be a candidate embedding site. One or more of the constraints 600 applied on the embed side may also be applied. These constraints may be applied in step 1710 in embodiments of method 1700. Those skilled in the art will recognize that a variety of constraints may be applied to a variety of candidate site characteristics, and that these constraints do not limit the scope of this invention. In embodiments, the constraint 1805 is applied to the bounding box fitted to the connected component of the candidate site.

Constraint 1805 is an embodiment of a size constraint. In embodiments, a candidate site is retained as an embedding site if the width and height of its bounding box exceed a size threshold. In embodiments, the width and height values may have separate or the same threshold values. In embodiments, the size threshold may be smaller than the value of the first size threshold that may have been used in size constraint 605 in the embed side. For example, in an embodiment using an input image on the order of 4800-by-6818 pixels in size, a threshold value may be a bounding box of 40-by-40 pixels in size. In this case, the size constraint for selecting candidate embedding sites to examine for embed patterns is more relaxed than the size constraint for selecting candidate embedding sites to receive embed patterns. The more relaxed size constraint will result in more candidate sites being identified for examination for embed patterns than are identified for receiving embed patterns. Although more false sites (those not containing embed patterns) may be identified as candidate embedding sites because of the relaxed constraint, this approach may improve robustness of the extraction process since the size of an embedding site may be altered as a result of modification of the image.

2. Extracting a Bitstream from an Image

Figure 19:
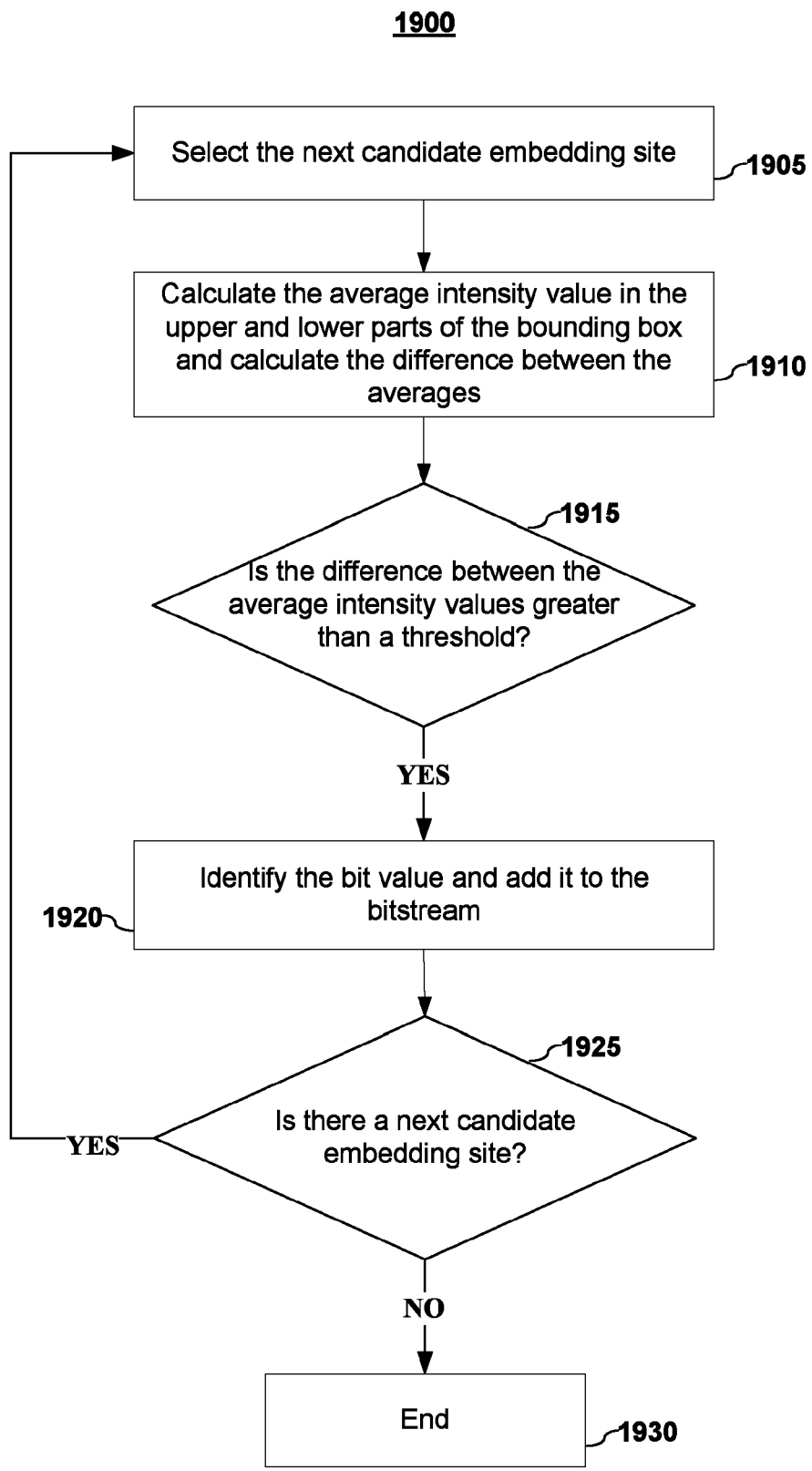
FIG. 19 depicts a method for extracting a bitstream from an image according to various embodiments of the invention.

FIG. 19 depicts a method 1900 for extracting a bitstream from an image according to embodiments of the invention. Method 1900 may be implemented as step 1515 of embodiments of method 1500 and in embodiments of bitstream extractor 175.

In embodiments, a bitstream is extracted from a watermarked image by determining the bit values embedded into the ordered sequence of candidate embedding sites. For each candidate embedding site (step 1905), a bit value may be determined by first computing the average intensity values of the pixels within portions of the candidate embedding site, and then computing the relative difference between those values (step 1910). In various embodiments, the average intensity value may be the mean, median, or mode, or may be a robust mean median, or mode. In certain embodiments, the portions may be the upper and lower parts of the bounding box fitted to an embedding site. The intensity difference between the upper and lower parts is calculated, and if that intensity difference is greater than a threshold, an embed pattern is identified and a bit value is considered to have been embedded in the embedding site (step 1915). The bit value is identified and added to the bitstream (step 1920). This method is repeated for all embedding sites within the ordered sequence (steps 1925 and 1930). For example, in embodiments using the bit value encoding scheme in the example described for embodiments of method 1300, the bit value would be assigned 1 if the upper part of a connected component were lighter by a threshold than its lower part, and the bit value would be assigned 0 if the upper part of a connected component were darker by a threshold than its lower part. One skilled in the art shall recognize that the step of determining a difference between portions (step 1915) and the step of identifying the bit value (step 1920) may be combined as a single step. For example, if the difference between the average intensity of the upper portion minus the average intensity of the lower portion is greater than a threshold, T, then the bit value is 1. If the difference is less than −T, then the value is 0. If the difference between the two portions of a candidate embedding site is not greater than a threshold, it may be assumed that no bit was embedded at the site.

In embodiments, there typically is no a priori knowledge of which candidate embedding sites contain embed patterns. As an image is processed, the overall image characteristics may be altered in ways that may impede detection of an embed pattern. For example, printing of an image may introduce half tones that may mitigate intensity differences. Modifications such as scaling and cropping of an image may alter the size and shape of embedding sites and thus might affect detection of different regions within an embedding site. In embodiments, an analysis of the characteristics of the pixels of a candidate embedding site may lead to identification of the embed pattern that may have been embedded into the site.

In embodiments, the image characteristics may have determined a decision about the direction in which the embedding sites were ordered and the extraction method is not based upon a priori knowledge of the decision. For example, in embodiments having an image containing lines of characters, the lines of embedding sites may be ordered from top to bottom or be ordered from right to left. In embodiments, a determination of the direction in which the embedding sites were ordered may be made by extracting the bitstream from an image, then rotating the image by an angle such as 90 degrees, for example, and then extracting the bitstream from the rotated image and comparing the number of bits in each bitstream. The direction in which the embedding sites were ordered may be determined by which bitstream contains a greater number of bits.

a) Identifying an Embedding Site Using Cumulative Density Function

FIG. 20 depicts a method 2000 for identifying an embed pattern in a candidate embedding site according to embodiments of the invention. Method 2000 comprises the steps of dividing a candidate embedding site into two sections (step 2005), computing the mean intensity value of the pixels within each section using a cumulative density function (step 2010), and using the difference between the mean intensity values to determine the embed pattern, if any (step 2015). Method 2000 may be implemented in embodiments of steps 1910 through 1920 of method 1900.

Figure 21:
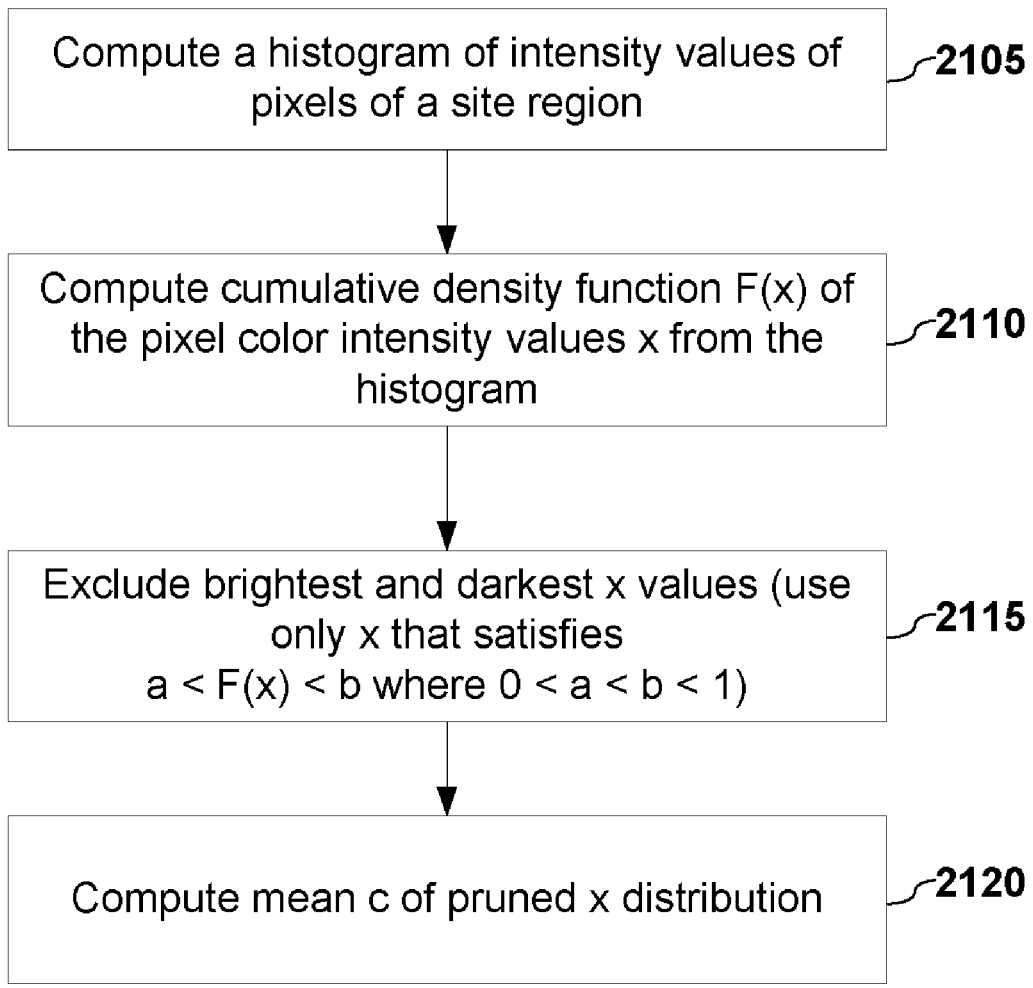
FIG. 21 depicts a method for computing the average intensity of pixels in a region of a candidate embedding site using cumulative density function according to various embodiments of the invention.

FIG. 21 depicts a method 2100 for computing the average intensity value of pixels within a portion of a candidate embedding site according to embodiments of the invention. Method 2100 comprises the steps of computing a histogram of intensity values of pixels of a candidate embedding site region (step 2105), computing a cumulative density function of the pixel color intensity values from the histogram (step 2110), pruning the distribution of color intensity values to exclude the brightest and darkest values (step 2115), and computing the average intensity value as the mean of the intensity values in the pruned distribution. Method 2100 may be implemented as step 2010 in embodiments of method 2000.

In embodiments, the distribution of the color intensity values of the set of pixels within a region of a candidate embedding site is mapped into a histogram (step 2105).

Figure 22A:
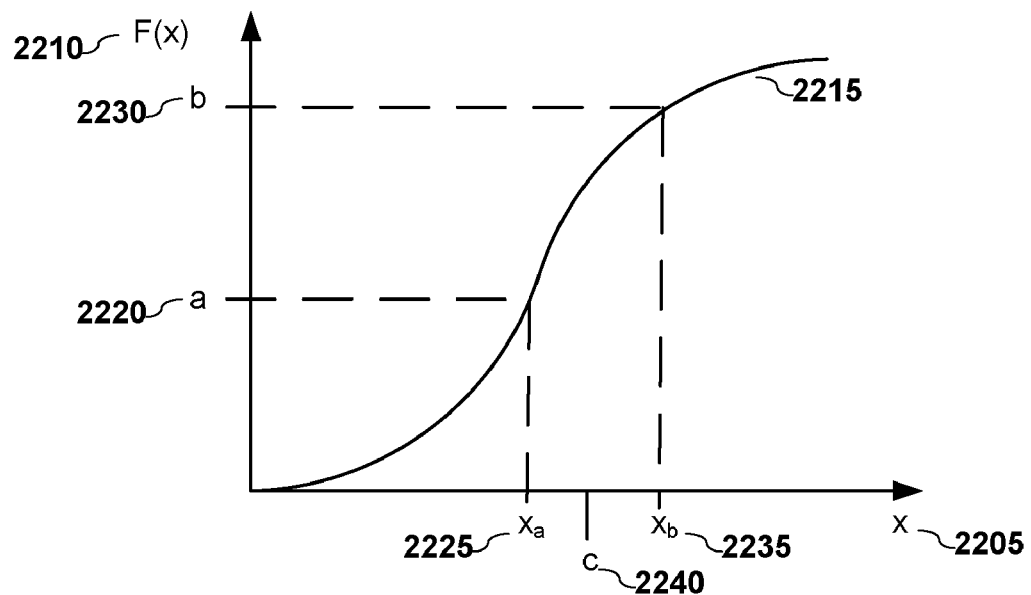
FIG. 22A depicts a graphical illustration of the computation of a cumulative density function for the intensity values of a distribution of pixels in a region of a candidate embedding site according to various embodiments of the invention.

FIG. 22A depicts a graphical illustration of the computations in steps 2110, 2115, and 2120 according to embodiments of the invention. Using the histogram, a cumulative density function $F(x)$ (2210) is computed for the pixel color intensity value x (2205) (step 2110). The curve 2215 is the relationship between $F(x)$ (2210) and x (2205). In embodiments, a dark color threshold value a (2220) of $F(x)$ and a light color threshold value b (2230) of $F(x)$ are chosen where $a<F(x)<b$, and $0<a<b<1$. In step 2115, the pixels having the darkest color intensity values (pixels with a color intensity value less than $x_a$ (2225)) and the pixels having the lightest color intensity values (pixels with a color intensity value greater than $x_b$ (2235)) are excluded from the set of pixels. In embodiments, the average intensity c (2240) is calculated as the mean intensity value of the pruned set of pixels (step 2120).

(i) Computation of the Average Intensity Using Darker Colors

Figure 23:
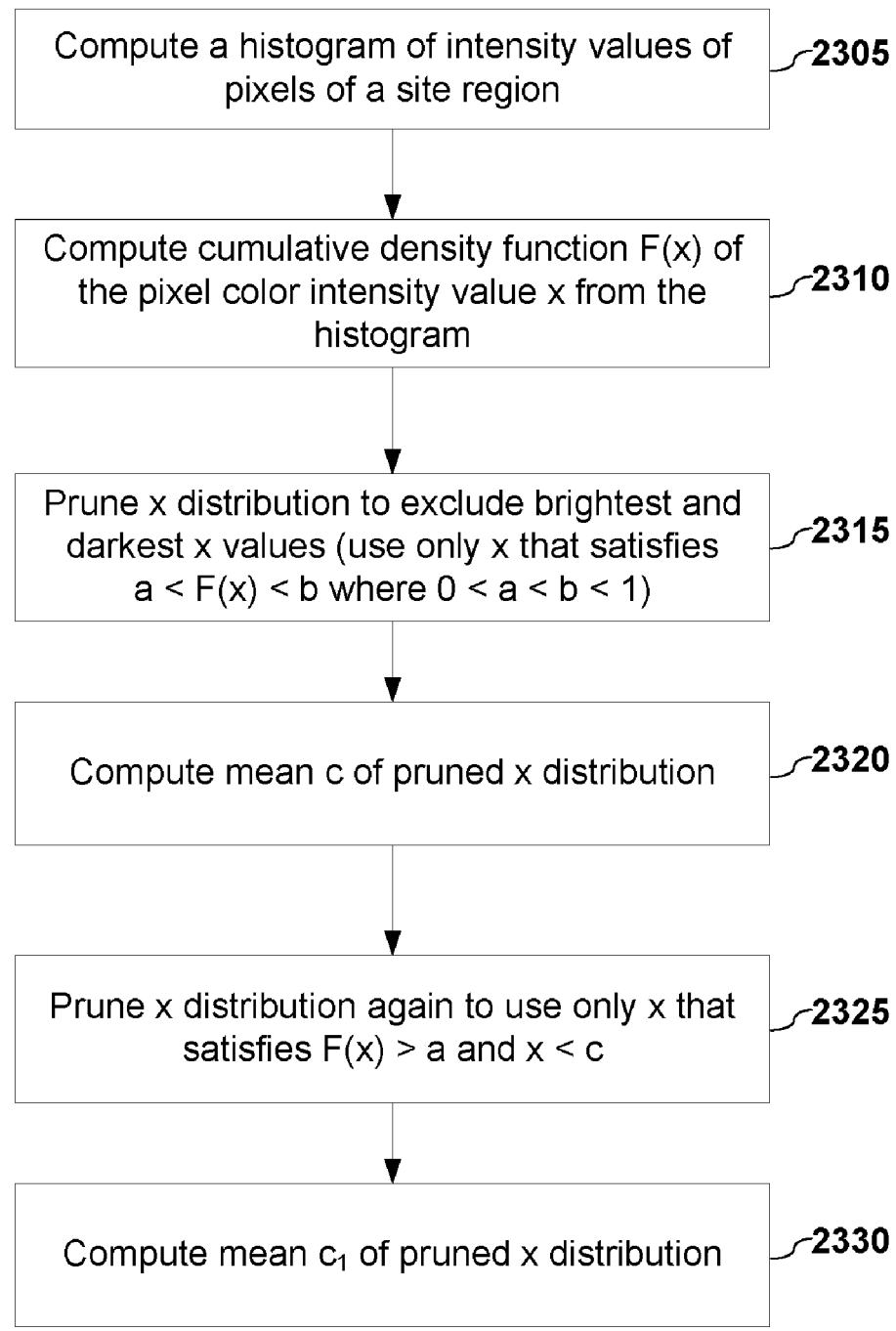
FIG. 23 depicts a method for computing the average intensity of pixels having the darkest intensities in a region of a candidate embedding site using cumulative density function according to various embodiments of the invention.

FIG. 23 depicts an alternative method 2300 for computing the average intensity value of pixels within a portion of a candidate embedding site according to embodiments of the invention. The steps 2305 through 2320 of method 2300 are similar or the same as steps 2105 through 2120 that have been described for method 2100. Method 2300 further comprises the steps of further pruning the set of pixels within a region of a candidate embedding site to use only pixels with darker colors (step 2325), and computing an average color intensity value using the further pruned set of pixels. In embodiments, weighting of the pixel distribution in favor of pixels that have darker color intensities when calculating the average intensity value may compensate for image intensity modifications resulting from, for example, the use of lower quality printers to reproduce images. Method 2300 may be implemented as step 2010 in embodiments of method 2000.

Figure 22B:
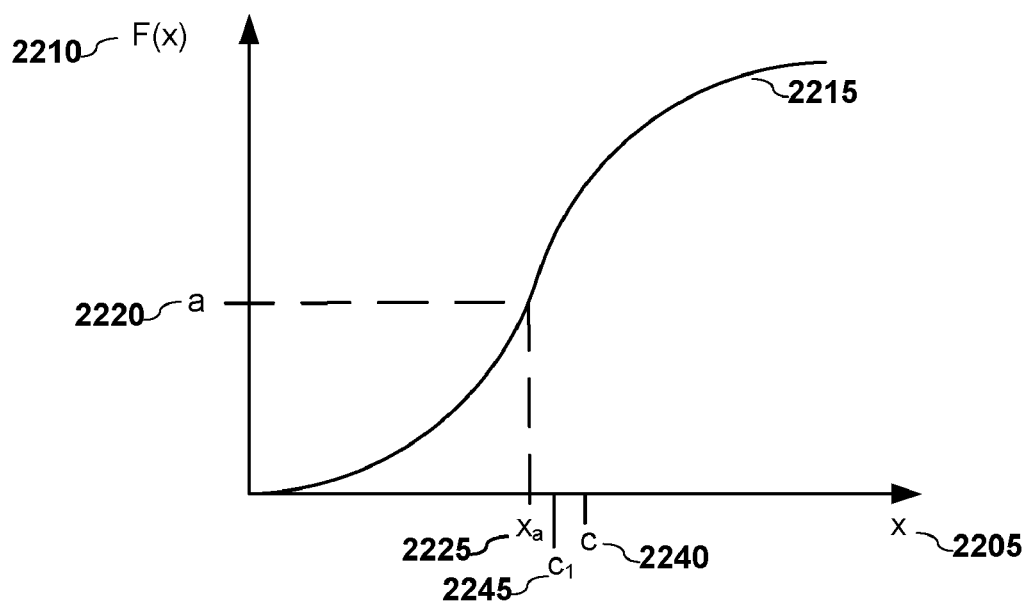
FIG. 22B depicts a graphical illustration of the computation of a cumulative density function for the intensity values of a distribution of pixels with the darkest intensities in a region of a candidate embedding site according to various embodiments of the invention.

FIG. 22B depicts a graphical illustration of the computations in steps 2325 and 2330 according to embodiments of the invention. In step 2325, pixels with a color intensity value greater than the mean color intensity value c (2240) are further excluded from the pruned set of pixels. In embodiments, the set of pixels now has been pruned to contain pixels with color intensity values between $x_a$ (2225) and c (2240). The average intensity value $c_1$ (2240) is calculated as the mean intensity value of the further pruned set of pixels (step 2330).

b) Identifying an Embedding Site Using Iterative Mean Estimation

Figure 24:
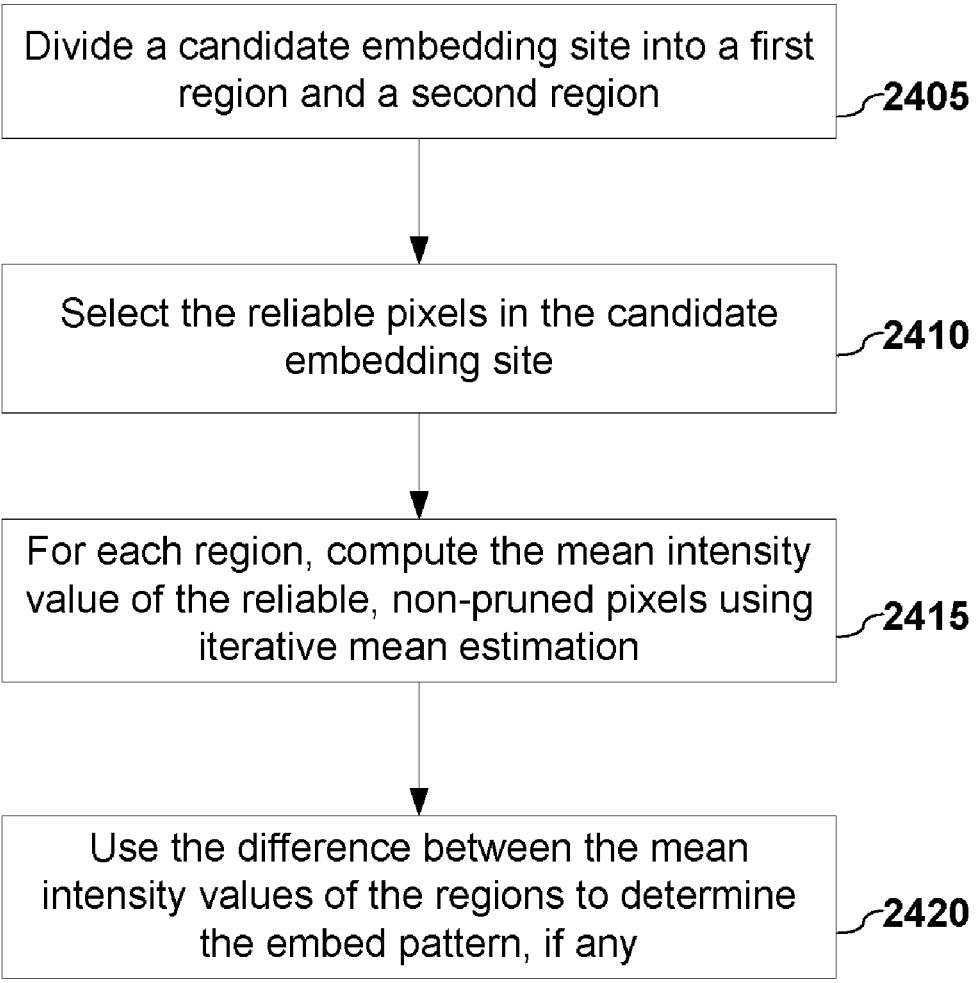
FIG. 24 depicts a method for identifying an embed pattern in a candidate embedding site using iterative mean estimation according to various embodiments of the invention.

FIG. 24 depicts a method 2400 for identifying an embed pattern in a candidate embedding site according to embodiments of the invention. Method 2400 comprises the steps of dividing a candidate embedding site into two regions (step 2405), selecting the reliable pixels in the candidate embedding site (step 2410), computing the mean intensity value of the reliable pixels within each region using iterative mean estimation (step 2415), and using the difference between the mean intensity values to determine the embed pattern, if any (step 2420). Method 2400 may be implemented in embodiments of steps 1910 through 1920 of method 1900.

(i) Selection of Reliable Pixels

In embodiments, analysis of intensity values of the pixels within a candidate embedding site may identify the embed pattern that may have been embedded into the site. In embodiments, the pixels located on the boundaries of a candidate embedding site may not have intensity values that are consistent with the pixels inside of the connected component(s) associated with the site due to, for example, a half-tone effect (non-uniformity of color intensity within a region) introduced by some printers. In embodiments, these boundary pixels may be excluded from the set of pixels within an embedding site to create a set of reliable pixels that may be used for an analysis of intensity values (step 2410).

Figure 25:
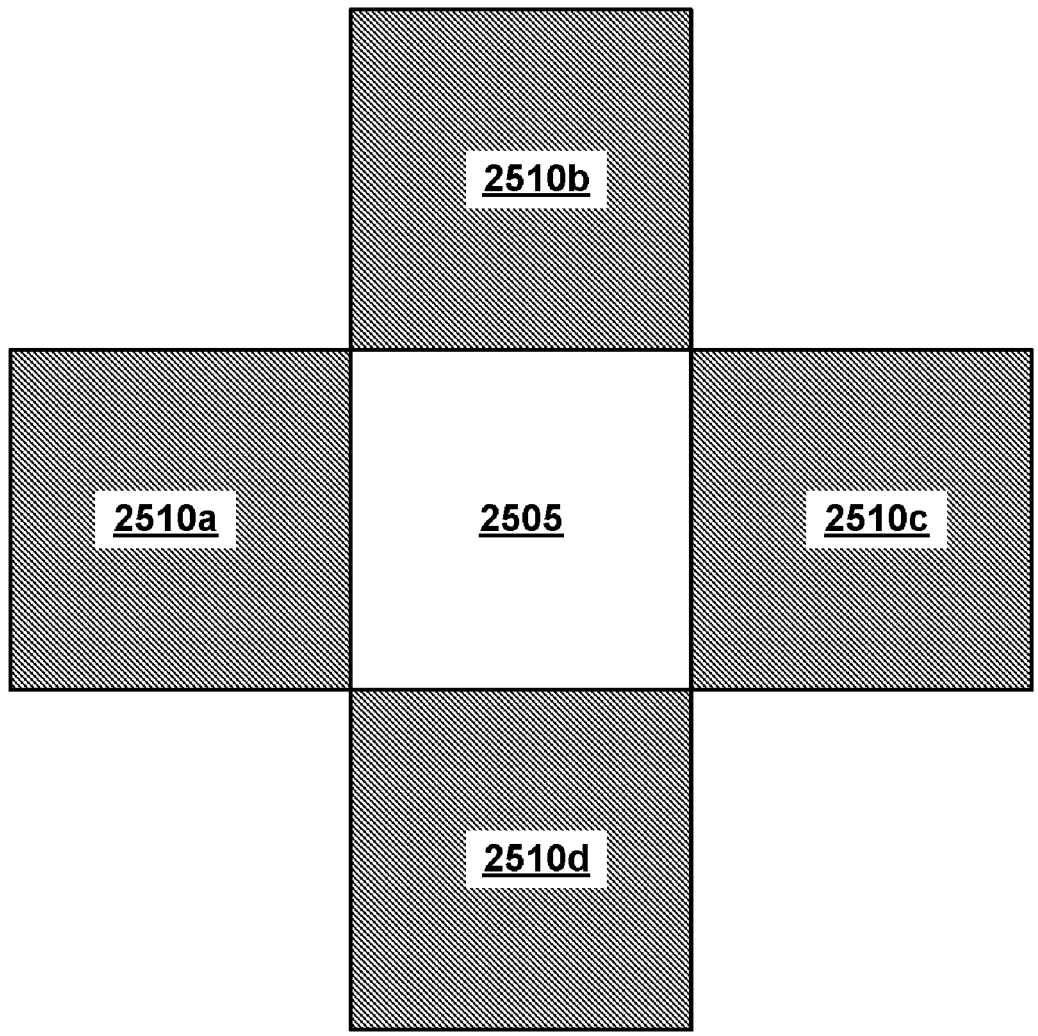
FIG. 25 illustrates selection of reliable pixels using nearest neighboring pixels according to various embodiments of the invention.

FIG. 25 illustrates an example of selection of reliable pixels using a neighborhood of surrounding pixels according to embodiments of the invention. A pixel (2505) may be selected as a reliable pixel if the pixels that are its four nearest neighbors (2510a-d) belong to the same connected component as the pixel (2505).

(ii) Computation of Average Intensity by Iterative Mean Estimation

Figure 26:
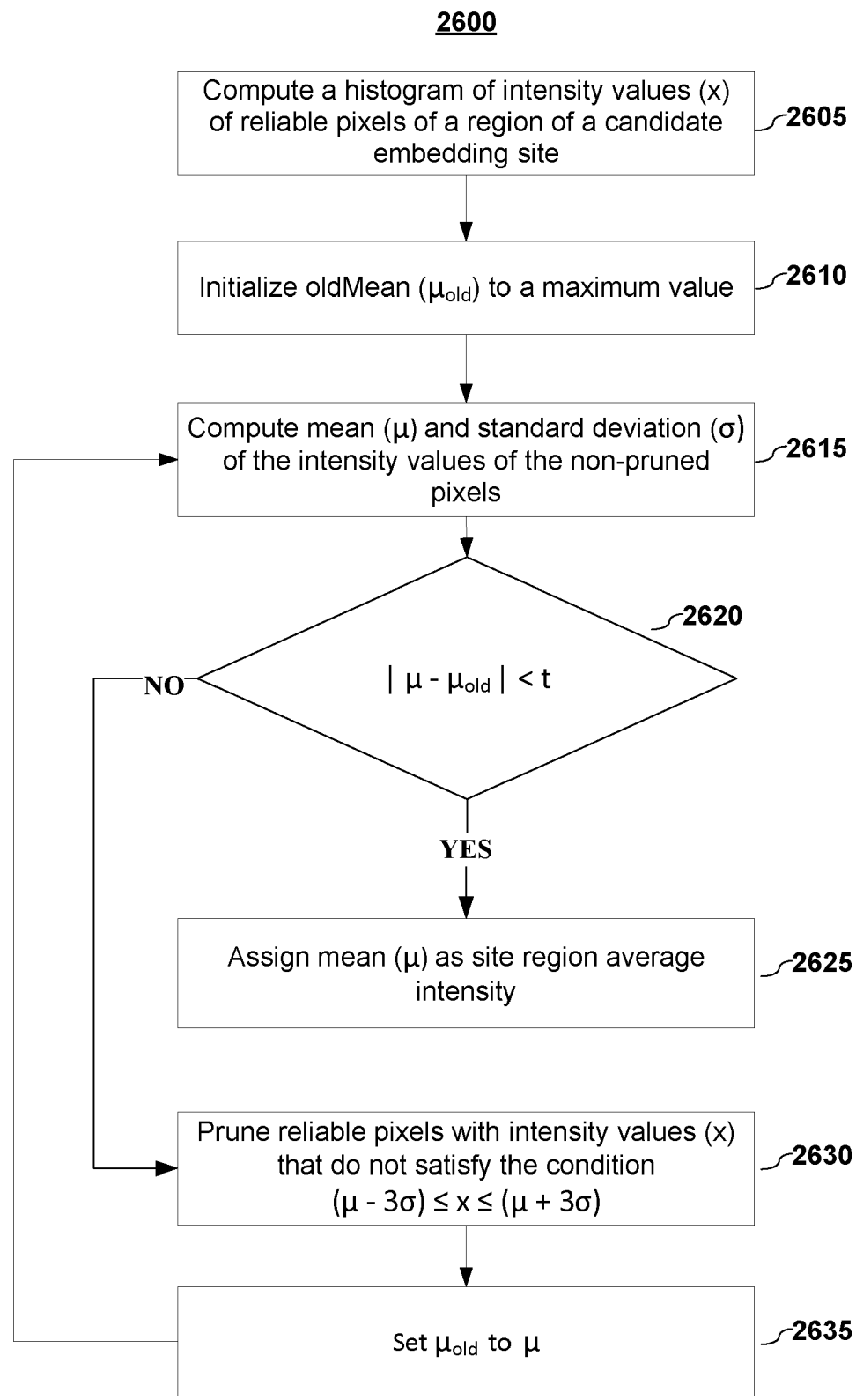
FIG. 26 depicts a method for computing the average intensity of pixels in a region of a candidate embedding site using iterative mean estimation according to various embodiments of the invention.

FIG. 26 depicts a method 2600 for computation of average intensity of a group of reliable pixels using iterative mean estimation according to embodiments of the invention. Method 2600 may be implemented as step 2415 in embodiments of method 2400.

Figure 27:
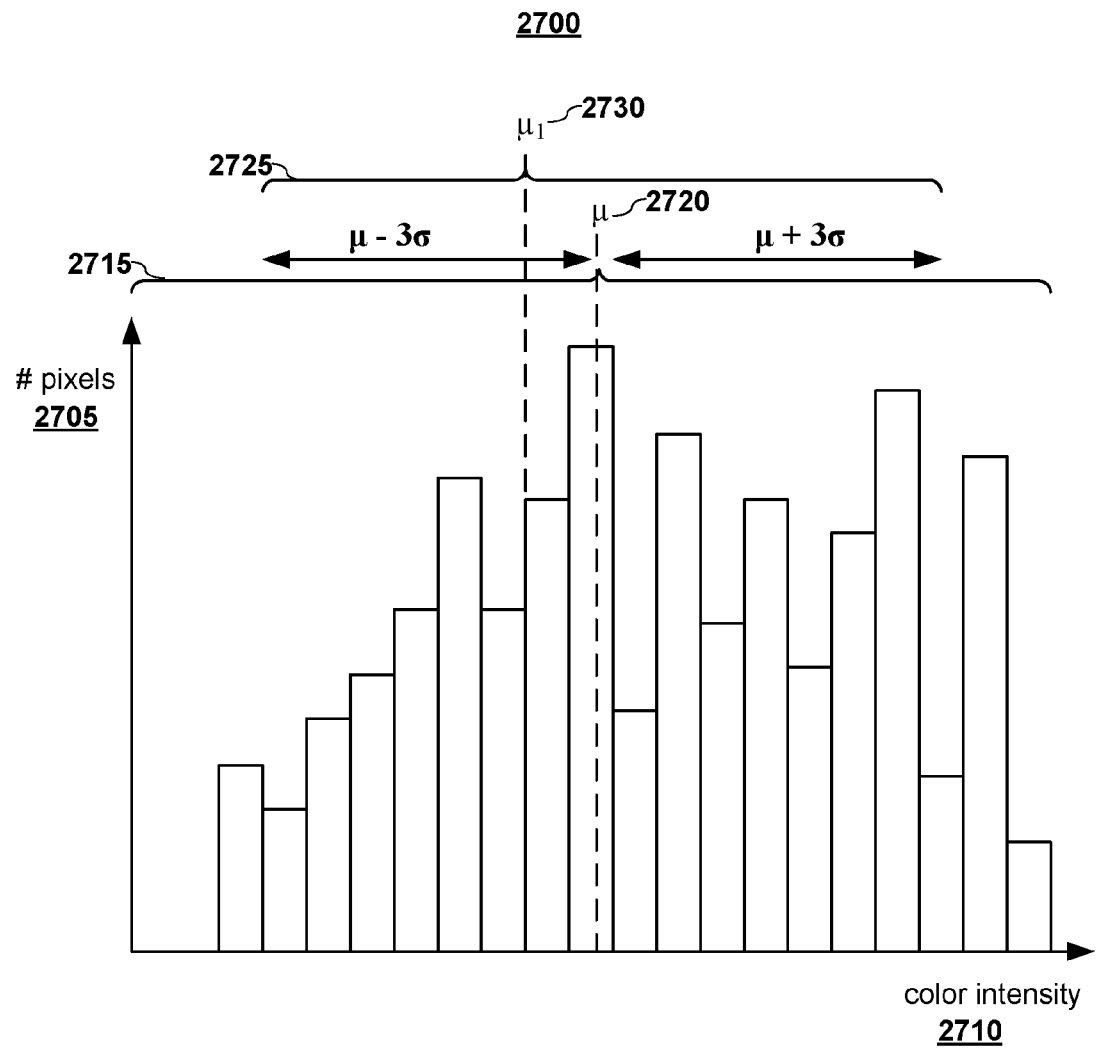
FIG. 27 depicts a graphical illustration of the computation of the average intensity value of a distribution of pixels using iterative mean estimation according to various embodiments of the invention.

FIG. 27 depicts a graphical illustration of the computations in steps 2605 through 2635 according to embodiments of the invention. The histogram 2700 represents the distribution of the color intensity values (2710) of the set of reliable pixels (2705) within a region of a candidate embedding site (step 2605). In step 2610, the initial distribution parameters are assumed to span the full range of color intensities (2715), and a threshold parameter, $\mu_{old}$, may be initialized to a maximum value (255, for example). The mean ($\mu$) (2720) and standard deviation ($\sigma$) are computed for the intensity values within the set of pixels (step 2615). The difference between $\mu$ and $\mu_{old}$ is compared to a threshold t (step 2620). If the difference is greater than the threshold, each pixel with an intensity value x that does not satisfy the condition $(\mu-3\sigma) \leq x \leq (\mu+3\sigma)$ may be pruned from the distribution (step 2630). This creates a pruned distribution of pixels (2725) that has a different mean $\mu_1$ (2740), and the value of $\mu_{old}$ is set to $\mu$ (step 2635). Steps 2615, 2620, 2630, and 2635 are repeated until the difference computed in step 2620 is less than the threshold t. At that time, the average intensity value for the site region may be set using one or both of the last mean values. In embodiments, the average intensity value for the site region may be set to the current value of $\mu$.

3. Segmenting a Bitstream into Bit Vectors

Figure 28:
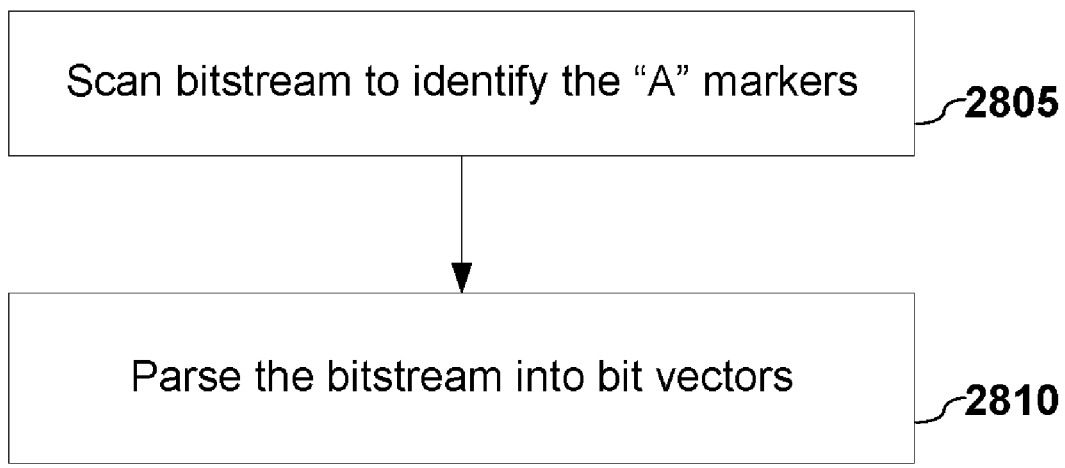
FIG. 28 depicts a method for parsing a bitstream into bit vectors according to various embodiments of the invention.

FIG. 28 depicts a method 2800 for parsing an image bitstream into message bit vectors according to embodiments of the invention. Method 2800 may be implemented as step 1520 of embodiments of method 1500 and in embodiments of bitstream segmenter 180.

In embodiments, the image bitstream may be segmented by being parsed to extract instances of the message bit vector that may have been written into the bitstream. In certain embodiments, identifying the bit encoded "A" indicator prefix facilitates identification of the beginning of a message bit vector within a bitstream (step 2805). In embodiments, the indicator "A" may be compared to the bit stream using the XOR operator to identify the "A" header in the bitstream.

Since generation of a watermarked image may have modified the image (for example, the watermarked image may be a scanned image), parsing the image bitstream (step 2810) may not be performed using exact token matching. For example, in certain embodiments, parsing the bitstream may be performed by determining bitwise similarity between a candidate bit vector within the bitstream and the bit vector representing the indicator prefix "A."

4. Decoding an Embedded Bit Vector to Extract a Watermark Message

Figure 29:
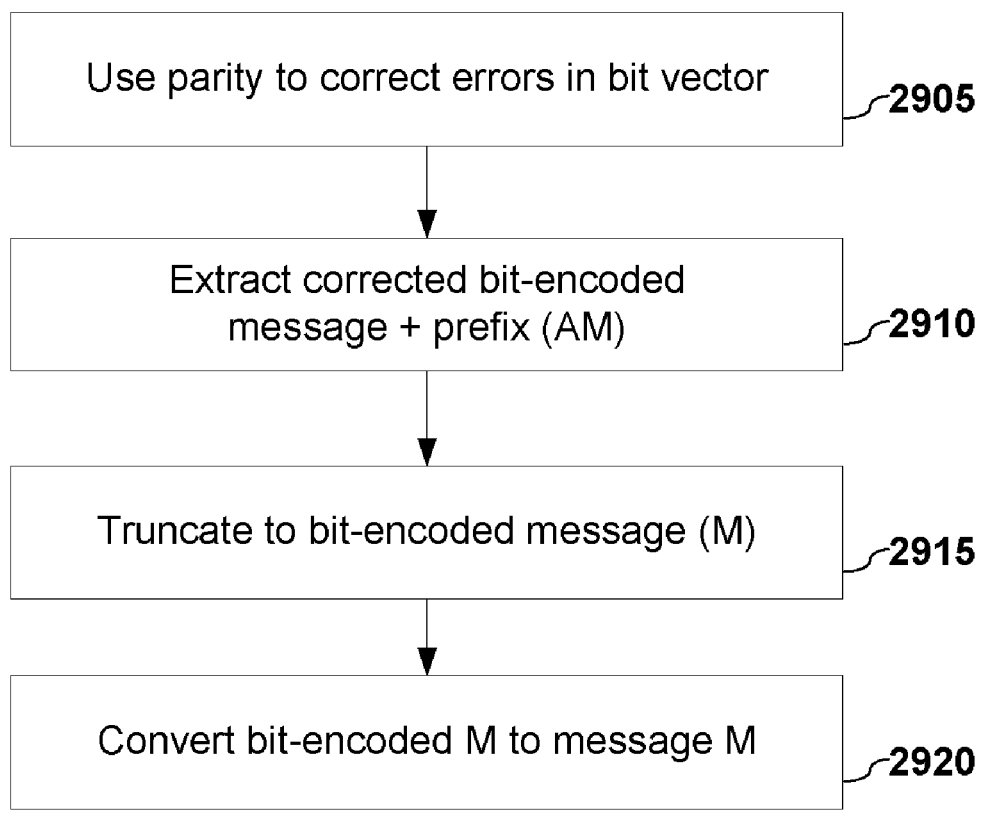
FIG. 29 depicts a method for decoding a bit-encoded message according to various embodiments of the invention.

FIG. 29 depicts a method 2900 for decoding a message bit vector to extract a watermark message according to embodiments of the invention. Method 2900 may be implemented as step 1525 of embodiments of method 1500 and in embodiments of decoder 145.

In embodiments in which the message bit vector was encoded using an ECC, the parity portion of the bit vector is used by the ECC decoder to correct errors that may be in the data portion of the bit vector (step 2905). An example of such an error is swapped bits that may be a result of the process (for example, printing) that generated the watermarked image. In embodiments, a corrected bit vector may be a bit-encoded message and its indicator prefix ("AM") (step 2910). The watermark message may be generated by decoding the characters in the M portion of a bit vector (steps 2915 and 2920).

It shall be noted that the present invention may be implemented in any instruction-execution/computing device or system capable of processing the image data, including without limitation, a general-purpose computer and a specific computer, such as one intended for graphics processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 30:
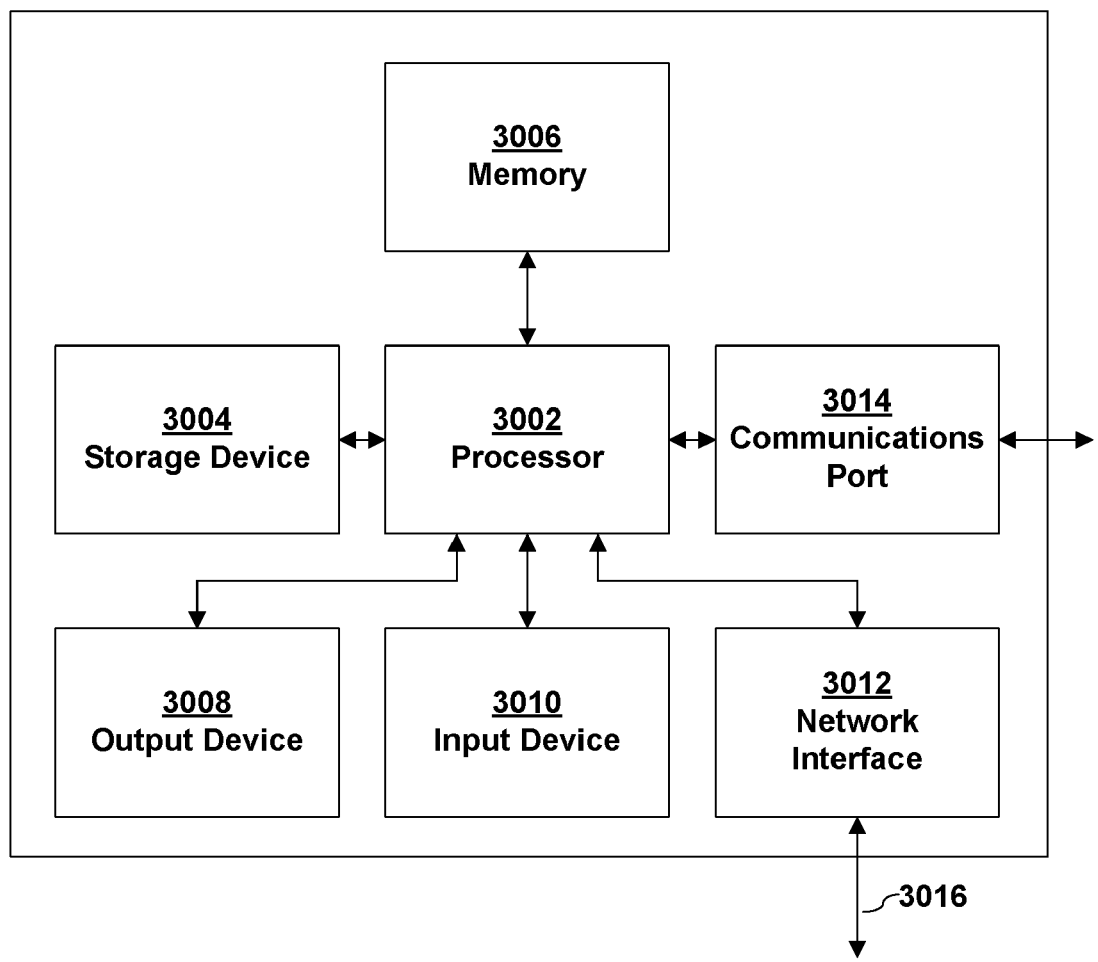
FIG. 30 depicts a block diagram of a computing system according to various embodiments of the invention.

FIG. 30 depicts a functional block diagram of an embodiment of an instruction-execution/computing device 3000 that may implement or embody embodiments of the present invention. As illustrated in FIG. 30, a processor 3002 executes software instructions and interacts with other system components. In an embodiment, processor 3002 may be a general purpose processor such as an AMD processor, an INTEL x86 processor, a SUN MICROSYSTEMS SPARC, or a POWERPC compatible-CPU, or the processor may be an application specific processor or processors. A storage device 3004, coupled to processor 3002, provides long-term storage of data and software programs. Storage device 3004 may be a hard disk drive and/or another device capable of storing data, such as a computer-readable media (e.g., diskettes, tapes, compact disk, DVD, and the like) drive or a solid-state memory device. Storage device 3004 may hold programs, instructions, and/or data for use with processor 3002. In an embodiment, programs or instructions stored on or loaded from storage device 3004 may be loaded into memory 3006 and executed by processor 3002. In an embodiment, storage device 3004 holds programs or instructions for implementing an operating system on processor 3002. In one embodiment, possible operating systems include, but are not limited to, UNIX, AIX, LINUX, Microsoft Windows, and the Apple MAC OS. In embodiments, the operating system executes on, and controls the operation of, the computing system 3000.

An addressable memory 3006, coupled to processor 3002, may be used to store data and software instructions to be executed by processor 3002. Memory 3006 may be, for example, firmware, read only memory (ROM), flash memory, non-volatile random access memory (NVRAM), random access memory (RAM), or any combination thereof. In one embodiment, memory 3006 stores a number of software objects, otherwise known as services, utilities, components, or modules. One skilled in the art will also recognize that storage 3004 and memory 3006 may be the same items and function in both capacities. In an embodiment, one or more of the components of FIGS. 1A through 1E may be modules stored in memory 3004, 3006 and executed by processor 3002.

In an embodiment, computing system 3000 provides the ability to communicate with other devices, other networks, or both. Computing system 3000 may include one or more network interfaces or adapters 3012, 3014 to communicatively couple computing system 3000 to other networks and devices. For example, computing system 3000 may include a network interface 3012, a communications port 3014, or both, each of which are communicatively coupled to processor 3002, and which may be used to couple computing system 3000 to other computer systems, networks, and devices.

In an embodiment, computing system 3000 may include one or more output devices 3008, coupled to processor 3002, to facilitate displaying graphics and text. Output devices 3008 may include, but are not limited to, a display, LCD screen, CRT monitor, printer, touch screen, or other device for displaying information. Computing system 3000 may also include a graphics adapter (not shown) to assist in displaying information or images on output device 3008.

One or more input devices 3010, coupled to processor 3002, may be used to facilitate user input. Input device 3010 may include, but are not limited to, a pointing device, such as a mouse, trackball, or touchpad, and may also include a keyboard or keypad to input data or instructions into computing system 3000.

In an embodiment, computing system 3000 may receive input, whether through communications port 3014, network interface 3012, stored data in memory 3004/3006, or through an input device 3010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for determining a robust average intensity of pixels from a portion of an image comprising pixels, the method comprising:
   computing a cumulative density function based upon an intensity histogram of the pixels from the portion of the image;
   using the cumulative density function to identify pixels to exclude;
   calculating a robust average intensity using at least some of the pixels that were not excluded;
   using the robust average intensity to determine an embed pattern in a candidate embedding site comprising pixels; and
   using the embed pattern to extract a data value from the candidate embedding site.

2. The method of claim 1 wherein the step of using the cumulative density function to identify pixels to exclude comprises:
   excluding the pixels having an intensity corresponding to a cumulative density function that is below a first cumulative density function threshold value; and
   excluding the pixels having an intensity corresponding to a cumulative density function that is above a second cumulative density function threshold value.

3. The method of claim 1 wherein the robust average intensity is a first mean intensity of the at least some of the pixels that were not excluded.

4. The method of claim 3 wherein the robust average intensity is a second mean intensity and the step of calculating a robust average intensity using at least some of the pixels that were not excluded further comprises:

excluding the pixels having an intensity value greater than the first mean intensity value; and calculating the second mean intensity using at least some of the pixels that were not excluded.

5. The method of claim 1 wherein using the robust average intensity to determine an embed pattern in a candidate embedding site comprises:

calculating a difference between a first robust average intensity value of pixels in a first portion of the candidate embedding site and a second robust average intensity value of pixels in a second portion of the candidate embedding site; and responsive to the difference between the first robust average intensity value and the second robust average intensity value being greater than a threshold, determine the embed pattern by determining which robust average intensity value is greater than the other robust average intensity value.

6. The method of claim 5 wherein the step of using the embed pattern to extract a data value from the candidate embedding site comprises correlating the embed pattern with the data value.

7. A computer readable medium having instructions for performing the method of claim 1.

8. A method for extracting a data vector from an image comprising pixels wherein the data vector comprises data values, the method comprising:

identifying an embed pattern in a candidate embedding site in the image wherein an embed pattern comprises a difference between a robust average intensity of pixels from a first portion of the candidate embedding site and a robust average intensity of pixels from a second portion of the candidate embedding site;

correlating the embed pattern with a data value;

extracting a set of data values from a set of ordered candidate embedding sites in the image; and extracting at least one data vector by segmenting the set of data values.

9. The method of claim 8 wherein the step of identifying an embed pattern in a candidate embedding site in the image comprises:

responsive to the difference between the first robust average intensity value and the second robust average intensity value being greater than a threshold, identify the embed pattern by determining which robust average intensity value is greater than the other robust average intensity value.

10. The method of claim 9 wherein the robust average intensity is a first mean intensity of the at least some of the pixels that were not excluded.

11. The method of claim 10 wherein the robust average intensity is a second mean intensity and the step of calculating a robust average intensity using at least some of the pixels that were not excluded further comprises:

excluding the pixels having an intensity value greater than the first mean intensity value; and calculating the second mean intensity using at least some of the pixels that were not excluded.

12. The method of claim 8 wherein calculating a robust average intensity comprises:

computing a cumulative density function based upon an intensity histogram of the pixels from a portion of the image;

using the cumulative density function to identify pixels to exclude; and calculating a robust average intensity using at least some of the pixels that were not excluded.

13. The method of claim 12 wherein the step of using the cumulative density function to identify pixels to exclude comprises:

excluding the pixels having an intensity corresponding to a cumulative density function that is below a first cumulative density function threshold value; and excluding the pixels having an intensity corresponding to a cumulative density function that is above a second cumulative density function threshold value.

14. The method of claim 8 wherein identifying a set of ordered candidate embedding sites in the image comprises:

segmenting the image into regions;

dilating pixels from one of the regions;

identifying a plurality of connected components from a set of pixels selected from the region with dilated pixels;

selecting a set of candidate embedding sites wherein a candidate embedding site comprises at least one connected component is selected from the plurality of connected components; and assigning an order to the candidate embedding sites within the set of candidate embedding sites.

15. A computer readable medium having instructions for performing the method of claim 8.

16. A system for extracting a data vector from an image comprising pixels wherein the data vector comprises data values, the system comprising:

an embedding site ordering processor, coupled to receive a set of candidate embedding sites from the image, that orders at least some candidate embedding sites from the set of candidate embedding sites to form a set of ordered candidate embedding sites;

a bitstream extractor, coupled to receive the set of ordered candidate embedding sites, that extracts a set of data values from at least some of the set of ordered candidate embedding sites wherein a data value is extracted from an ordered candidate embedding site by examining a difference between a first robust average intensity value of the pixels in a first portion of the ordered candidate embedding site and a second robust average intensity value of the pixels in a second portion of the ordered candidate embedding site; and a bitstream segmenter, coupled to receive the set of data values, that segments the set of data values to obtain at least one data vector.

17. The system of claim 16 wherein calculating a robust average intensity by performing the steps comprises:

computing a cumulative density function based upon an intensity histogram of the pixels from a portion of the image;

using the cumulative density function to identify pixels to exclude; and calculating a robust average intensity using at least some of the pixels that were not excluded.

18. The system of claim 17 wherein the step of using the cumulative density function to identify pixels to exclude comprises:

excluding the pixels having an intensity corresponding to a cumulative density function that is below a first cumulative density function threshold value; and excluding the pixels having an intensity corresponding to a cumulative density function that is above a second cumulative density function threshold value.

19. The system of claim 18 wherein the robust average intensity is a first mean intensity of the at least some of the pixels that were not excluded.

20. The system of claim 19 wherein the robust average intensity is a second mean intensity and calculating a robust average intensity using at least some of the pixels that were not excluded further by performing the steps further comprises:
excluding the pixels having an intensity value greater than the first mean intensity value; and
calculating the second mean intensity using at least some of the pixels that were not excluded.

* * * * *